United States Patent
Mori et al.

(10) Patent No.: US 7,136,831 B2
(45) Date of Patent: Nov. 14, 2006

(54) COLLECTION INFORMATION MANAGEMENT SERVER AND COLLECTION INFORMATION MANAGEMENT METHOD

(75) Inventors: Hiromi Mori, Kanagawa (JP); Rikio Shiba, Kanagawa (JP); Kotaro Yamaguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 796 days.

(21) Appl. No.: 10/126,526

(22) Filed: Apr. 22, 2002

(65) Prior Publication Data

US 2003/0009383 A1 Jan. 9, 2003

(30) Foreign Application Priority Data

Apr. 27, 2001 (JP) ............................ 2001-132932
Apr. 11, 2002 (JP) ............................ 2002-109443

(51) Int. Cl.
*G06Q 20/00* (2006.01)
(52) U.S. Cl. .............................. 705/28; 705/1; 705/22; 705/29
(58) Field of Classification Search ................. 705/28, 705/1, 22, 29
See application file for complete search history.

(56) References Cited

U.S. PATENT DOCUMENTS

| | | | |
|---|---|---|---|
| 5,930,771 A * | 7/1999 | Stapp ........................... | 705/28 |
| 6,405,178 B1* | 6/2002 | Manchala et al. ............ | 705/29 |
| 6,820,972 B1* | 11/2004 | Kinalski ....................... | 347/85 |
| 6,947,903 B1* | 9/2005 | Perry ........................... | 705/28 |
| 6,965,875 B1* | 11/2005 | Levine ......................... | 705/27 |
| 2001/0037267 A1* | 11/2001 | Sato et al. .................... | 705/29 |
| 2002/0055883 A1* | 5/2002 | Shiba et al. .................. | 705/26 |

FOREIGN PATENT DOCUMENTS

EP    448039 A2 *   3/1991

OTHER PUBLICATIONS

"Globalization", Information Week, 38 (1) Jan. 1999.*

* cited by examiner

*Primary Examiner*—Joseph A. Fischetti
(74) *Attorney, Agent, or Firm*—Fitzpatrick, Cella, Harper & Scinto.

(57) ABSTRACT

Collection status and delivery status of recoverable products are stored in a database in association with a plurality of suppliers, and unitarily managed at a collection center. Collection/delivery information associated with identification information transmitted from a terminal is returned as required.

1 Claim, 37 Drawing Sheets

FIG. 9

REGISTRATION / EDITING OF SUPPLIER INFORMATION

ENTER ALL ITEMS AND CLICK ON "OK" TO HAVE SUPPLIER CODE
AND PASSWORD FOR DATABASE ACCESS ISSUED.

SUPPLIER NAME
ADDRESS
PHONE
FAX
E-MAIL

REGISTER

SUPPLIER CODE =
PASSWORD =

CANCEL
OK

FIG. 11

```
┌─────────────────────────────────────────────────────┐
│          ┌─────────────────────────────┐            │
│          │  DELIVERY SCHEDULE SETTING  │            │
│          └─────────────────────────────┘            │
│                                                     │
│       SET SCHEDULE FOR DELIVERY OF COLLECTED PRODUCTS. │
│                                                     │
│   ⦿ REGULAR      ○ MONTHLY ON   [▼        ]         │
│     DELIVERY                                        │
│                  ○ WEEKLY ON    [▼        ]         │
│                                                     │
│                  ⦿ BIWEEKLY ON  [▼ WED.   ]         │
│                                                     │
│                  ○ OTHER        [          ]        │
│                                                     │
│   ○ NON-REGULAR  ○ UPON EVERY COLLECTION AND        │
│     DELIVERY       CLASSIFICATION                   │
│                                                     │
│                  ○ WHEN CONTAINER IS FULL           │
│                                                     │
│       CLICK ON "OK"                                 │
│       TO PROCEED TO CONFIRMATION.                   │
│                                                     │
│           ( BACK TO MENU )     (   OK   )           │
│                                                     │
└─────────────────────────────────────────────────────┘
```

FIG. 13

DELIVERY / COLLECTION INFORMATION

05 / 10 / 2001

SELECT MONTH: 05 / 2001 ▽

QUANTITY COLLECTED THIS MONTH: 100   (QUANTITY COLLECTED IN TOTAL : 2500)

QUANTITY DELIVERED THIS MONTH
(QUANTITY NOT DELIVERED LAST MONTH): 50 (40)

QUANTITY TO BE COLLECTED: 130

DELIVERY SCHEDULE

| DELIVERY DATE | QUANTITY |
|---|---|
| NEXT 05 / 17 | 150 |
| 05 / 31 | 40 |
| 06 / 13 | 10 |

[DELIVERY RECORD]   [CLOSE]

FIG. 14

REGISTRATION / EDITING OF USER INFORMATION

USER CODE [▼]  [SEARCH]

USER NAME
ADDRESS
PHONE
FAX
E-MAIL

[REGISTER]

USER CODE = _____
PASSWORD = _____

[OK]  [CANCEL]  [CLOSE]

FIG. 20

ENTRY OF COLLECTION REQUEST

ENTER COLLECTION SCHEDULE YOU WISH AND QUANTITY TO BE COLLECTED, AND THEN CLICK ON "SUBMIT"

DESIRED SCHEDULE   YEAR [ ]   MONTH [ ]   DATE [ ]   TIME [ ]
QUANTITY [ ] UNITS

[SUBMIT]

COLLECTION SCHEDULE IS SHOWN BELOW.
CLICK ON "OK" OR "RESET."

COLLECTION SCHEDULE [                    ]

[OK]   [RESET]   [CLOSE]

FIG. 21

COLLECTION SCHEDULE

YOUR NEXT SCHEDULED COLLECTION IS BELOW.

NOTE : SCHEDULED COLLECTION MAY NOT BE CANCELLED WITHIN A WEEK PRIOR TO SCHEDULED DATE.

14:00 ON MAY 24 (WED.), 2001
10 UNITS TO BE COLLECTED

SELECT WHEN TO RECEIVE COLLECTION RECORD REPORT.
○ END OF EACH MONTH  ● AT TIME OF DELIVERY ( CANCEL COLLECTION )   ( COLLECTION RECORD )   ( CLOSE )

FIG. 23

| AREA | QUANTITY TO BE COLLECTED ON MAY 24 |
|---|---|
| A | 200 |
| B | 130 |
| C | 200 |
| D | 60 |

FIG. 24

| AREA | QUANTITY TO BE COLLECTED ON MAY 24 |
|---|---|
| A1 | 200 |
| A2 | 40 |
| B1 | 130 |
| C1 | 200 |
| D1 | 60 |

FIG. 25

| AREA | QUANTITY TO BE COLLECTED ON MAY 24 | VEHICLE ALLOCATION |
|---|---|---|
| A1 | 200 | #1 |
| C1 | 200 | #2 |
| B1 | 130 | #3 |
| D1 | 60 | AGENT |
| A2 | 40 | AGENT |

FIG. 28

| | |
|---|---|
| TOTAL COUNT / JAM COUNT | ~901 |
| A3 COUNT / JAM COUNT | ~902 |
| A4 COUNT / JAM COUNT | ~903 |
| ⋮ | |
| REMAINING TONER | ~904 |
| USAGE START DATE / END DATE | ~905 |
| USAGE PERIOD | ~906 |
| TYPE ID / SERIAL NUMBER | ~907 |
| ⋮ | |

FIG. 36

DELIVERY RECORD INFORMATION

SELECT PERIOD                                              3603 ~ 05 / 10 / 2001

3601 — FROM 01 / 2001 ▽

3602 — TO CURRENT ▽

3604 — DELIVERY RECORD     3605           3606        3607

| SUPPLIER | PRODUCT | DELIVERY DATE | QUANTITY |
|----------|---------|---------------|----------|
| CANXN    | CRG A   | 01 / 10 / 2001 | 10 |
| CANXN    | CRG B   | 02 / 10 / 2001 | 5  |
| CANYN    | CRG C   | 03 / 10 / 2001 | 15 |
|          |         | TOTAL          | 30 |

3607 — [ CLOSE ]

COLLECTION INFORMATION MANAGEMENT SERVER AND COLLECTION INFORMATION MANAGEMENT METHOD

BACKGROUND OF THE INVENTION

1. Field of the Invention

The present invention relates to collection information management servers and collection information management methods, and more specifically to a collection information management server, a collection information management method, a storage medium, and a program for unitarily managing collection of used office machines or products related to the office machines.

2. Description of the Related Art

Office machines such as copying machines, facsimile machines, and printers are widely used. Consumable products used in the office machines, for example, toner, are often supplied in a form encapsulated in cartridges. The cartridges are sometimes used, in addition to serving as containers of toner, etc., as components in which consumable products such as photosensitive drums, developing devices, and cleaning members are incorporated, and sometimes used only to contain toner, etc. The consumable products are either discarded or recovered in some way after use.

Consumable products to be recovered include, in addition to cartridges, toner bottles and photosensitive drums for copying machines, ink containers, cartridges, and print heads for ink-jet printers, other types of service parts, and paper and OHP sheets. Furthermore, office machines such as printers, copying machines, scanners, facsimile machines themselves may also be recovered. In the following description, products to be recovered will be simply referred to as "consumable products."

The consumable products described above are usually manufactured or recycled (hereinafter referred to as "supply") by manufactures or dealers of office machines in which the consumable products are used.

Suppliers of the consumable products, including manufacturers and dealers, individually recover used consumable products and recycle the consumable products that have been recovered. That is, the consumable products are recovered by manufacturers, dealers, etc. of the consumable products (hereinafter referred to as recovery agents). Some manufacturers recycle and sell cartridges manufactured by another manufacturer.

In a known system, users of the consumable products request recovery of used consumable products via phone or facsimile.

However, in that system, when a user requests recovery of different types of consumable products, the user must request recovery to a plurality of recovery agents by methods respectively specified by the plurality of recovery agents, which is laborious for the user.

Furthermore, from the perspective of a recovery agent, which recovers used consumable products based on requests from users, users that request recovery are not always concentrated in a specific area as is convenient for the recovery agent. If the users that request recovery are geographically distributed, the recovery agent must recover products from a large area by trucks only for a small number of users. This raises recovery cost, and leads to emission of environmental pollutants associated with transportation by trucks, such as $CO_2$, NOx, and SOx.

SUMMARY OF THE INVENTION

The present invention has been made in order to solve the above problems individually or altogether, and an object thereof is to provide a system that allows a unitary collection of products related to office machines, provided by a plurality of manufacturers or dealers, so that the products will be efficiently collected.

Another object of the present invention is to provide a system for unitarily collecting consumable products, in which delivery/collection status of consumable products are managed on the basis of each of the plurality of manufacturers or dealers, so that suppliers of the consumable products can be notified of information that is useful for recycling, etc.

Another object of the present invention is to provide a system in which complexity and load of work associated with a collection request by a user is alleviated.

Another object of the present invention is to provide a system in which workload associated with a collection request is reduced also in a case where a user requests collection of consumable products provided by a plurality of manufacturers or dealers.

Another object of the present invention is to provide a system in which consumable products are collected, in response to a request from a user, more efficiently at a minimal cost while imposing less load on the environment.

To these ends, the present invention, in one aspect thereof, provides a management server for unitarily managing collection information of office products associated with a plurality of suppliers. The management server includes a management unit for managing collection information of a plurality of office products for each of the plurality of suppliers; an input unit for inputting identification information identifying one of the plurality of suppliers, transmitted from an external information processing apparatus via a predetermined communication link; an extracting unit for extracting collection information associated with the identification information input via the input unit; and a reporting unit for reporting the collection information extracted by the extracting unit to the information processing apparatus via the predetermined communication link.

The present invention, in another aspect thereof, provides a method of managing collection information by a management server for unitarily managing collection information of office products associated with a plurality of suppliers. The method includes a management step for managing collection information of a plurality of office products for each of the plurality of suppliers; an input step for inputting identification information identifying one of the plurality of suppliers, transmitted from an external information processing apparatus via a predetermined communication link; an extracting step for extracting collection information associated with the identification information input in the input step; and a reporting step for reporting the collection information extracted in the extracting step to the information processing apparatus via the predetermined communication link.

The present invention, in yet another aspect thereof, provides a program for a computer to execute a method of managing collection information by a management server for unitarily managing collection information of office products associated with a plurality of suppliers. The program includes a management step for managing collection information of a plurality of office products for each of the plurality of suppliers; an input step for inputting identification information identifying one of the plurality of suppliers, transmitted from an external information processing apparatus via a predetermined communication link; an extracting step for extracting collection information associated with the identification information input in the input step; and a reporting step for reporting the collection information extracted in the extracting step to the information processing apparatus via the predetermined communication link.

The present invention, in still another aspect thereof, provides a computer-readable storage medium storing a program for a computer to execute a method of managing collection information by a management server for unitarily managing collection information of office products associated with a plurality of suppliers. The program includes a management step for managing collection information of a plurality of office products for each of the plurality of suppliers; an input step for inputting identification information identifying one of the plurality of suppliers, transmitted from an external information processing apparatus via a predetermined communication link; an extracting step for extracting collection information associated with the identification information input in the input step; and a reporting step for reporting the collection information extracted in the extracting step to the information processing apparatus via the predetermined communication link.

According to the present invention, collection of office products can be unitarily managed. Furthermore, collection status of products can be supplied to suppliers of the products. In addition, consumable products such as office machines and process cartridges used in the office machines can be efficiently collected.

Further objects, features and advantages of the present invention will become apparent from the following description of the preferred embodiments with reference to the attached drawings.

BRIEF DESCRIPTION OF THE DRAWINGS

FIG. 9 is a diagram showing an example of supplier information registration/editing screen.

FIG. 11 is a diagram showing an example of delivery schedule setting screen.

FIG. 13 is a diagram showing an example of delivery information checking screen.

FIG. 14 is a diagram showing an example of user information registration/editing screen.

FIG. 20 is a diagram showing an example of collection request entry screen.

FIG. 21 is a diagram showing an example of collection schedule checking screen.

FIG. 23 is a diagram showing a quantity of used consumable products requested to be collected on a particular date in each area.

FIG. 24 is a diagram showing an example of a table showing divided areas and quantities to be collected.

FIG. 25 is a diagram showing a table in which records in the table shown in FIG. 24 are sorted by the quantity to be collected.

FIG. 28 is a diagram showing an example of data stored in a memory of the cartridge.

FIG. 36 is a diagram showing an example of delivery record information checking screen.

DESCRIPTION OF THE PREFERRED EMBODIMENTS

First Embodiment

Preferred embodiments of a system for recovering consumable products according to the present invention will now be described with reference to the accompanying drawings. When a specific type of consumable products must be mentioned in the course of the following description, the description will be made in the context of cartridges that are used in electrophotograpic printers, copying machines, facsimile machines, etc. However, as will be readily understood, the present invention is also applicable to other types of consumable products, such as toner bottles, photosensitive drums, other types of service parts, and paper and OHP sheets for copying machines, and ink containers, cartridges, and print-heads for ink-jet printers. Many of the consumable products are desired to be recovered after use, for example, emptied toner bottles and toner package boxes for copying machines.

Overview of Recovery System

Figure 1:
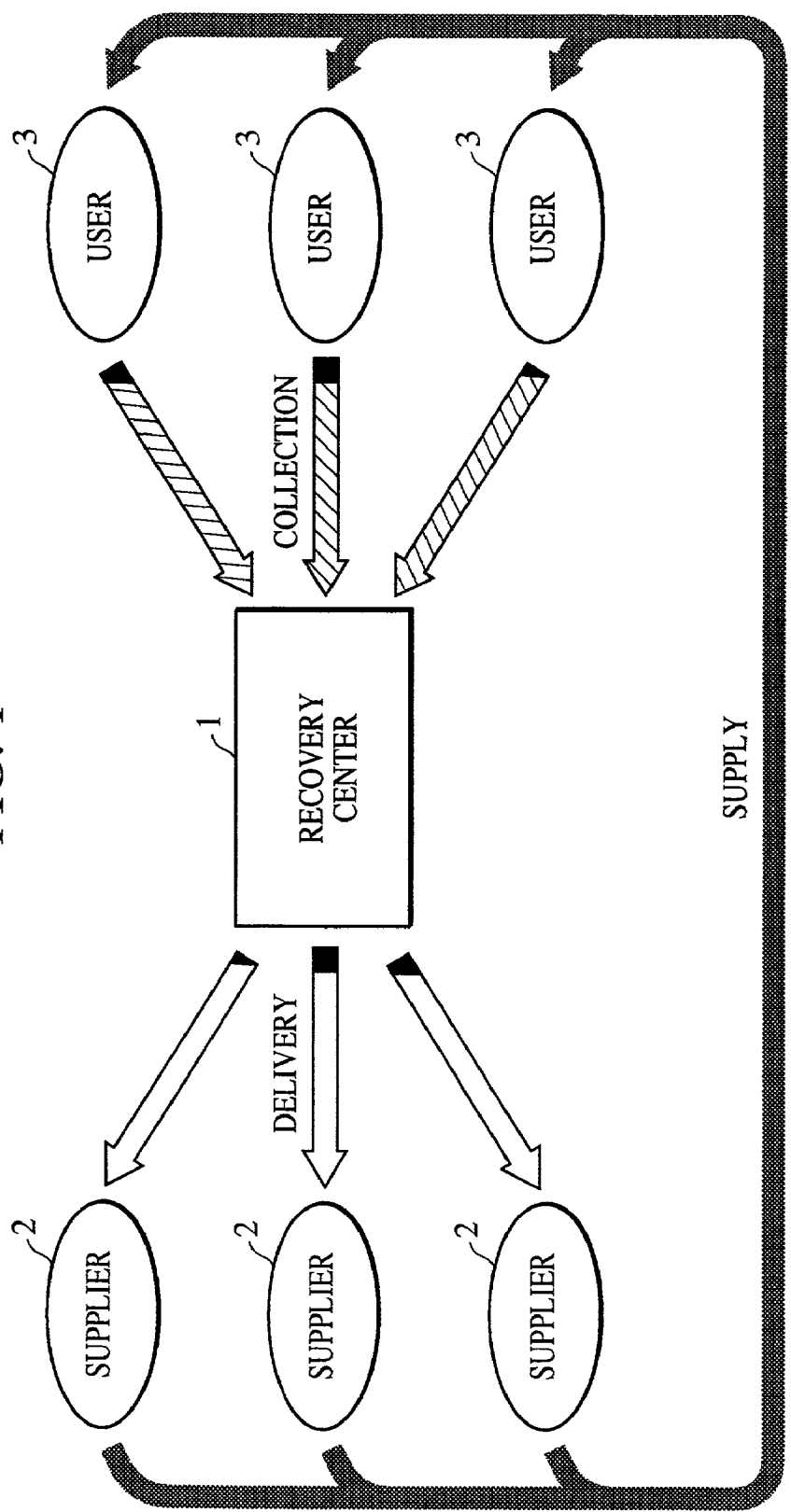
FIG. 1 is a diagram showing flows of consumable products among suppliers, users, and a recovery center.

FIG. 1 is a diagram showing flows of consumable products among suppliers 2, users 3, and a recovery center 1. "Recovery" in this specification is to be construed as being relevant to collection schedules, past collection records, delivery, etc. For example, "recovery management" refers to management of collection schedules, management of past collection records, and/or management of delivery of collected products, and "recovery center" in FIG. 1 manages collection schedules, past collection records, delivery of collected products, etc. In the sense that the recovery center 1 manages collection schedules and past collection records, the recovery center 1 may also be called a collection center. A supplier herein indicates an agent that sells, manufactures, or recovers consumable products for office machines, and may be either an individual or an organization.

A user herein primarily indicates a user of an image forming apparatus, etc.; however, it may also indicate a dealer that collects used consumable products from the general users and that then returns the collected consumable products to a supplier, a collection agent that collects used consumable products, etc., as the case may be.

Although the following description will often deal with consumable products, such as toner cartridges used in image forming apparatuses such as printers, as an example type of products to be recovered, the present invention is not limited thereto, and may also be applied to other types of products to be discarded or recovered, for example, electronic apparatuses such as main units of copying machines. In the following description, "supplier," "user," and "consumable product" should be construed as defined above.

Consumable products are sold by the suppliers 2 to the users 3 via sales channels. That is, the users 3 purchases consumable products from the suppliers 2 with payment and uses the consumable products. Used consumable products are transferred from the users 3 to the recovery center 1, classified at the recovery center 1 on the basis of the suppliers 2, and delivered to the respective suppliers 2.

Figure 2:
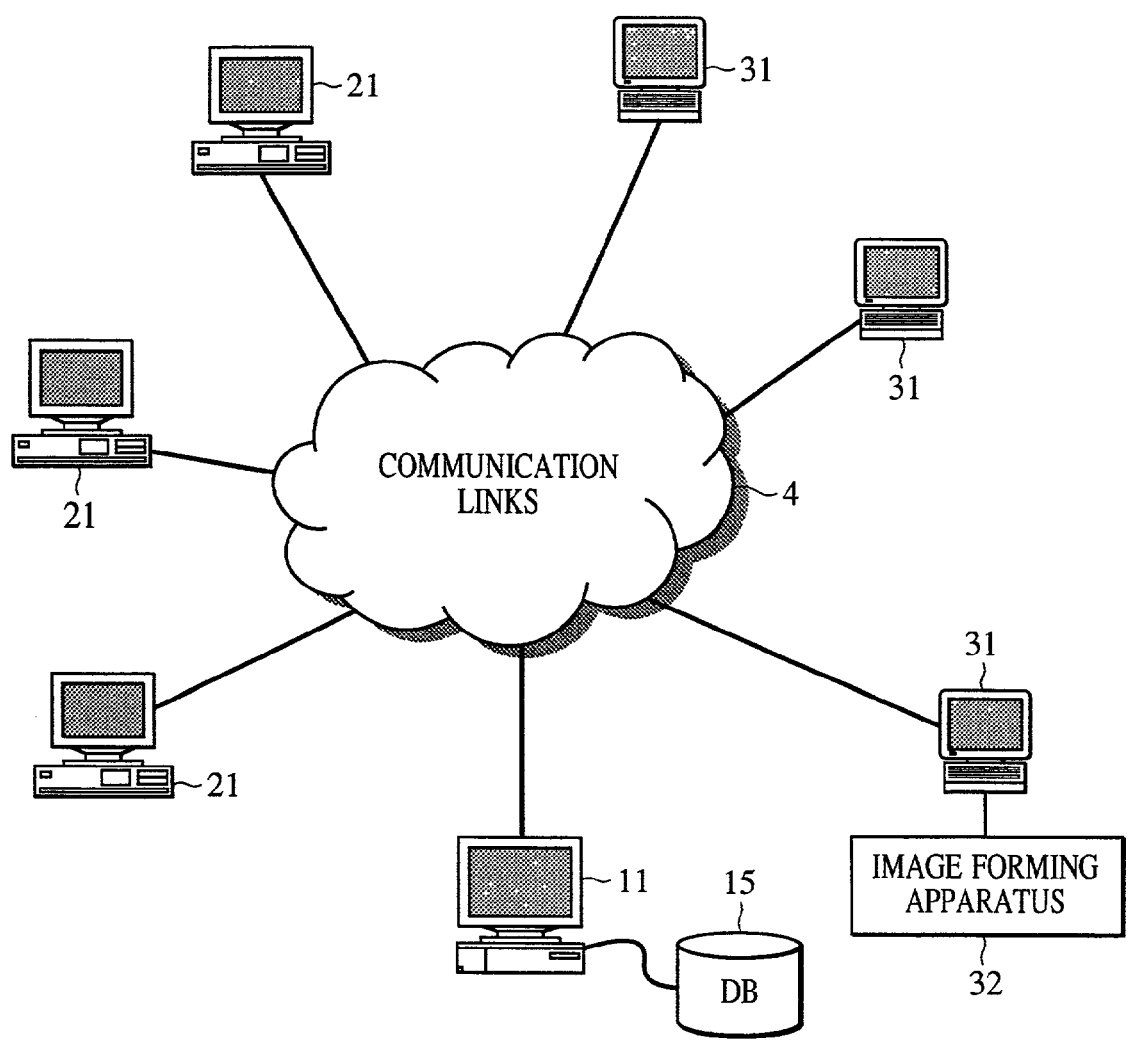
FIG. 2 is a diagram showing communication links among the suppliers, the users, and the recovery center.

FIG. 2 is a diagram showing an overview of a recovery system according to the present invention, and communications among the suppliers 2, the users 3, and the recovery center 1 will be now be described with reference thereto.

Referring to FIG. 2, terminal apparatuses 21 of the suppliers 2, terminal apparatuses 31 of the users 3, and a server apparatus 11 of the recovery center 1 communicate with each other via communication links 4, such as the Internet on which communications are carried out based on the TCP/IP communication protocols, executing processes such as recovery requests and recovery notifications. Furthermore, a database (DB) 15 is connected to the server apparatus 11. The functionality of the DB 15 is not necessarily provided physically by a single server apparatus, and may be distributed across a plurality of server apparatuses, or may be provided by a plurality of server apparatuses connected in parallel to each other. That is, the DB 15 may be implemented in any form as long as it is provided logically as a single database.

Electronic apparatuses, used in relation to the present invention, including the server apparatus 11, the supplier terminals 21, and the user terminals 31, are typically implemented by information processing apparatuses such as personal computers. However, as will be readily understood, other types of apparatus that is capable of communicating with remote electronic apparatuses via the Internet and executing various processes, for example, a printing apparatus or a portable terminal apparatus having the capability of Internet communications, may be used as an information processing apparatus that plays a central role in executing processes to be described later.

In the recovery system according to this embodiment, the users 3 are allowed to request collection of used consumable products uniformly to the recovery center 1 regardless of the identity of a supplier 2 associated with the used consumable products, thereby having the used consumable products transferred to the recovery center 1, as will be described later in more detail. Furthermore, the recovery center 1 collects a large number of used consumable products from the users 3, so that an efficient collection plan can be made up. Furthermore, the suppliers 2 receives a large number of used products at once from the recovery center 1, so that an efficient production plan for manufacturing consumable products can be made up with considerations to recycling. These advantages serve to efficiently reduce cost of recovery and recycling at the recovery center 1 and the suppliers 2. That is, since consumable products used by customers associated with a plurality of suppliers are collected together, the whole customer population is larger compared with a case where each of the suppliers individually makes up a collection plan; thus, variation in the customer population among different areas will be smaller, so that collection will be more efficient. Furthermore, the customers are allowed to use the same collection channel regardless of the identities of suppliers, and thus benefits from less complex work for requesting collection, which leads to improved recovery rate of used consumable products.

Figure 3:
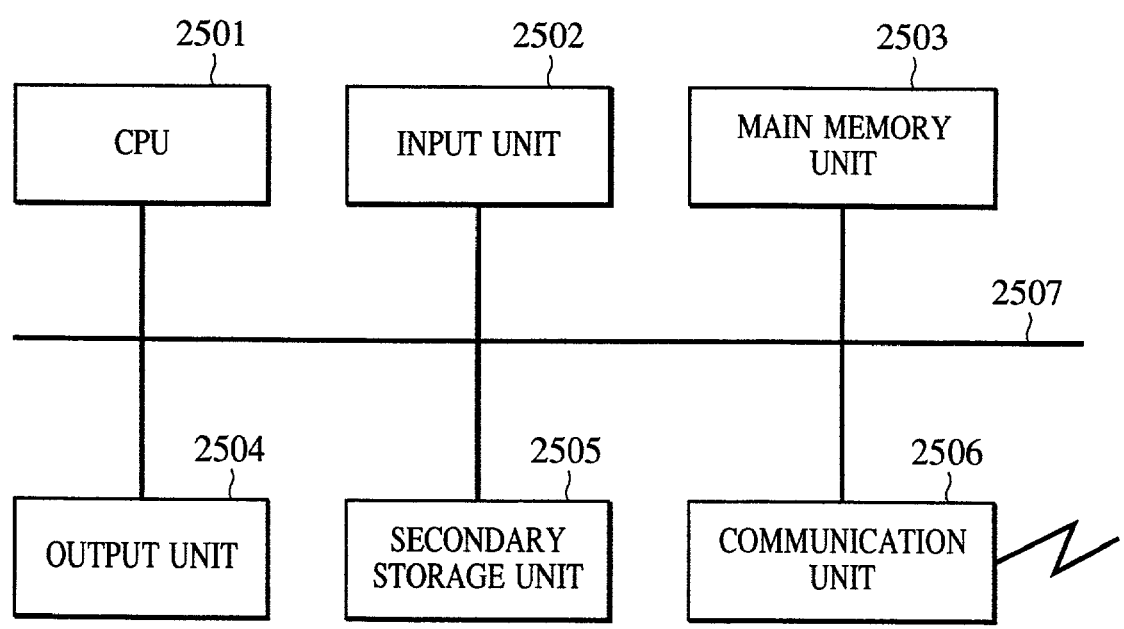
FIG. 3 is a diagram showing the internal structure of a server apparatus.

FIG. 3 is a diagram showing a typical internal structure of an information processing apparatus commonly in use, which can be applied to the server apparatus 11, the supplier terminals 21, and the user terminals 31. Referring to FIG. 3, the information processing apparatus includes a CPU (central processing unit) 2501, an input unit 2502, a main memory unit 2503, an output unit 2504, a secondary storage unit 2505, and a communication unit 2506.

The CPU 2501 sends instructions to other units within the system to control them, and performs operations on digital data. Processes in steps of a sequence diagram and flowcharts to be described later are implemented by the CPU 2501 reading program code stored in the secondary storage unit 2505 (ROM or hard disk) and executing processes according to the program code.

The input unit 2502 allows input of various data, and includes, for example, a keyboard, a pointing device such as a mouse, a touch panel, a pressure-sensitive pad, a CCD camera, a card reader, a paper tape reader, and a magnetic tape reader. When instruction data is input from the input unit 2502, for example, by a mouse via a predetermined interface screen, the CPU 2501 recognizes the input information and proceeds to the next process.

The main memory unit 2503 is the entire memory space that can be addressed for executing instructions in various processing apparatuses and internal storage units. The main memory unit 2503 is typically implemented by a semiconductor device, and it stores and holds program and data that have been input. The CPU 2501 reads data stored in the main memory unit 2503 out into, for example, a register.

The semiconductor device for implementing the main memory unit 2503 may be, for example, a RAM (random access memory) or a ROM (read-only memory). An ID and password information input via a predetermined user interface is temporarily stored in the main memory unit 2503, and then transmitted by the CPU 2501 via the communication unit 2506. The main memory unit 2503 also functions as a display memory for displaying a predetermined user interface screen.

The output unit 2504 is used for output of the results of operations by the CPU 2501. The output unit 2504 may be, for example, a CRT (cathode ray tube) display, a plasma display, a liquid crystal display, other types of display, a printing apparatus, or a speech output apparatus. For example, displays on the server apparatus 11, the supplier terminals 21, and the user terminals 31, which will be described later, are primarily achieved by the functions of the output unit 2504.

The secondary storage apparatus 2505 holds data in a non-volatile manner to supplement the storage capacity of the main memory unit 2503. The secondary storage unit 2505 may be, for example, a magnetic disk apparatus, an optical disk apparatus, a semiconductor disk apparatus, and a storage medium such as a floppy disk, a CD-ROM, a CD-R, a CD-RW, an MO, a DVD, and a corresponding media drive. The secondary storage unit 2505 functions as a database, and in this embodiment, it corresponds, for example, to the DB 15. Furthermore, similarly to the main memory unit 2503, the secondary storage unit 2505 is capable of storing programs. The secondary storage unit 2505 corresponds, for example, to the DB 15 to be described later, or an area in a terminal apparatus, in which predetermined electronic information is stored and managed.

The communication unit 2506 allows communications with external networks, and it performs data transmission and reception, digital-to-analog conversion, etc. as required in accordance with the type of a network in connection. In this embodiment, for example, a recovery notification is transmitted via the communication unit 2506 under the control of the CPU 2501. Transmission of control signals and display information among information apparatuses via communication links, which will be described later, are achieved primarily by the cooperation of the communication unit 2506 and the CPU 2501.

The units of the information processing apparatus described above are connected to each other via a system bus 2507 so that various data can be exchanged multilaterally among them.

Sequence in Recovery System

Figure 4:
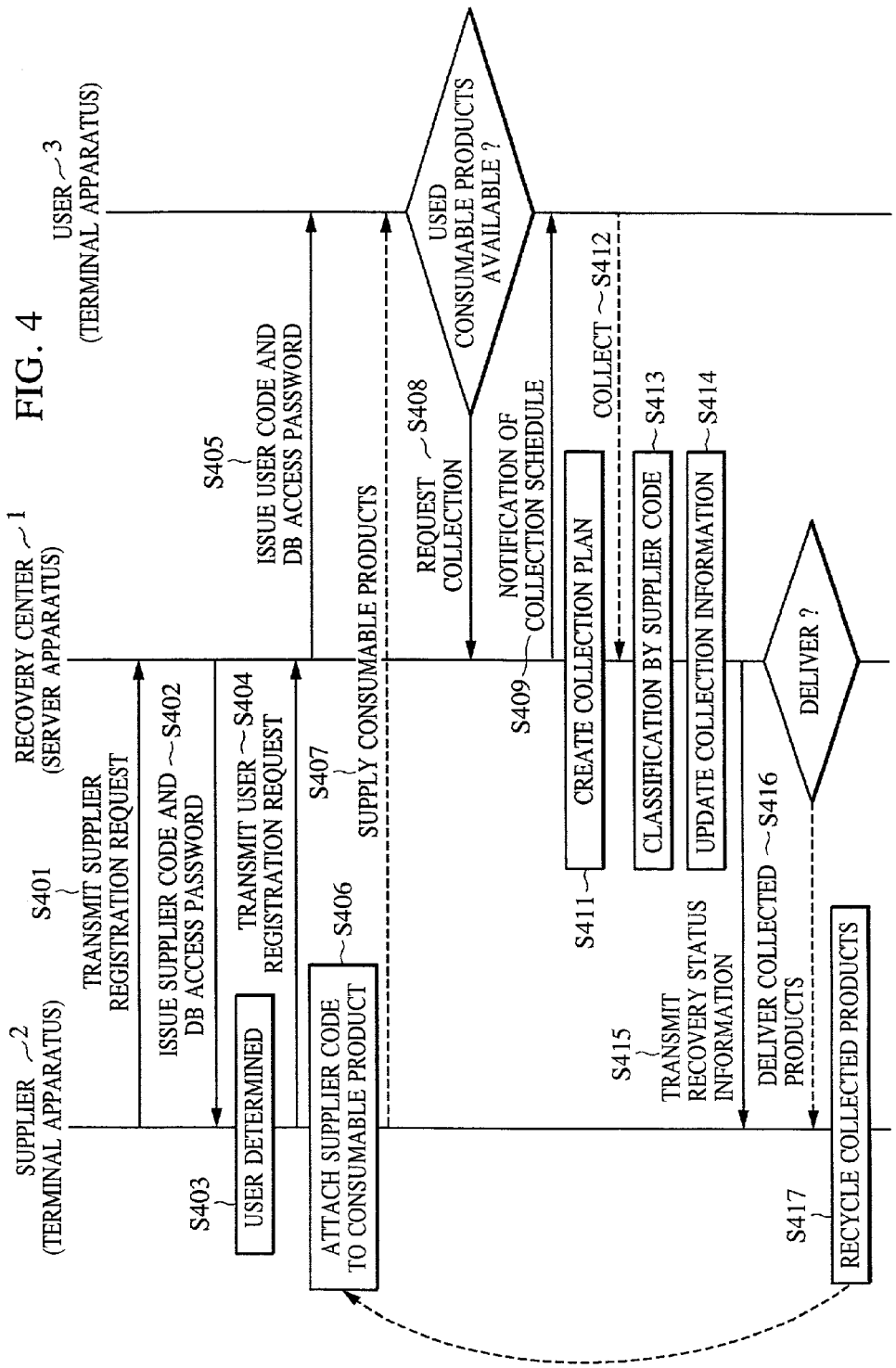
FIG. 4 is a diagram showing an example sequence of a recovery system.

FIG. 4 is a diagram showing an example recovery sequence in the recovery system. It is to be understood that transmission and reception of information shown in FIG. 4 are achieved by a supplier 2 and a user 3 accessing the server apparatus 11 provided at the recovery center 1 from a supplier terminal 21 and a user terminal 31, respectively.

In response to an instruction from the supplier 2, the supplier terminal 21 accesses the server apparatus 11 and transmits information for requesting registration as a supplier of consumable products (step S401). FIG. 9 is an example of supplier information registration/editing screen that is supplied from the server apparatus 11 and displayed on the supplier terminal 21 in response to the request from the supplier terminal 21 in step S401. The supplier information registration/editing screen allows the supplier 2 to register its information in the DB 15 and to edit registered supplier information. The supplier information registration/editing screen and operations to be performed thereon will be described later in more detail. Supply of various information via communication links herein means, to be more precise, transmission or notification of information; however, the term "supply" will be used hereinafter for simplicity of description.

In response to the supplier registration request, the server apparatus 11 issues a supplier code uniquely associated with the supplier 2 and a DB access password for accessing the DB 15 connected to the server apparatus 11. The supplier code and the DB access password are transmitted to the supplier terminal 21 via a predetermined communication link, whereby the supplier 2 is notified of the supplier code and the DB access password (step S402). The supplier code and the DB access password are issued by a CPU (central processing unit) provided in the server apparatus 11 executing a process according to program code stored in a storage unit. The supplier code and the DB access password are then stored and managed in the DB 15 in association with the supplier 2.

Then, when a user 3 to which consumable products are to be supplied is determined, the supplier terminal 21 manages user information of the user 3 in cooperation with the DB 15 (step S403). The supplier terminal 21 accesses the server apparatus 11 via the communication link to transmit information for requesting registration of the user information of the user 3 (step S404). FIG. 14 is an example of user information registration/editing screen supplied from the server apparatus 11 and displayed on the supplier terminal 21. The user information registration/editing screen allows the supplier 2 to register information of a new user in the DB 15 and to edit registered user information. The user information registration/editing screen and operations to be performed thereon will be described later in more detail. The process of step S403 need not necessarily be executed between steps S401 and S404, and may be executed at an arbitrary timing.

The user 3 to which consumable products are to be supplied is determined, for example, when a purchase order is placed on a commercial site that can be browsed on the user terminal 31 via the Internet, or when the supplier 2 is notified of a purchaser of an office machine or consumable products through a vendor thereof.

When user information of the user 3 is newly registered in the DB 15, the server apparatus 11 issues to the user a user code and a DB access password for accessing a user area in the DB 15. The user code and the DB access password are transmitted to the user terminal 31 via a communication link so that the user 3 will be notified of the user code and the DB access password (step S405). If network-based communication such as e-mail is not available, the user 3 may be notified of the user code and the DB access password, for example, by mail, facsimile, or a phone call from the recovery center 1. The same applies to the supplier code described earlier.

At a site of the supplier 2, the supplier code transmitted in step S402 is attached to each consumable product during manufacture thereof by a predetermined manufacturing apparatus (step S406). The supplier code is attached, for example, by storing the supplier code in a non-volatile memory provided in each consumable product, by automatically throwing a medium on which the supplier code is printed into a packaging box of each consumable product, by automatically attaching a medium on which the supplier code is printed to each consumable product being carried on a conveyor, etc. The supplier code may be attached without using such a manufacturing apparatus, for example, by manual work. Then, the consumable products are supplied to the user 3 (step S407). Arrows indicated by dotted lines in FIG. 4 indicate flows of the consumable products, such as delivery thereof.

The user 3, when used consumable products are to be recovered, accesses the server apparatus 11 by the user terminal 31 to submit a request for collecting the used consumable products (step S408). FIG. 20 is a diagram showing an example of collection request entry screen transmitted from the server apparatus 11 and displayed on the user terminal 31. The collection request entry screen allows the user 3 to request collection of used consumable products. The collection request entry screen and operations to be performed thereon will be described later in more detail. The process of step S408 need not necessarily be executed between steps S407 and S409, and may be executed at an arbitrary timing.

Upon receiving the collection request from the user terminal 31, the server apparatus 11 notifies the user terminal 31 of a collection schedule via a predetermined communication link (step S409). Information displayed at this time on a display unit of the user terminal 31 corresponds to "collection schedule" section shown in the lower part of the collection request entry screen shown in FIG. 20. The collection schedule the user terminal 31 is notified of is actually managed on the server apparatus 11 in association with the supplier 2. The collection schedule is reflected to a to-be-collected column 3508 in a collection/delivery information screen shown in FIG. 35 and to be described later, so that the collection schedule can be checked on the user terminal 31. Also, the supplier terminal 21 is allowed to retrieve the latest collection schedule information in real time. Furthermore, for example, if a collection schedule is determined by the server apparatus 11 upon receipt of collection requests from a predetermined number of user terminals 31, a collection schedule screen such as the one shown in FIG. 21 is supplied to each of the user terminals 31 upon determination of the collection schedule.

The server apparatus 11 then creates a collection plan at a timing and by a procedure to be described later (step S411). The creation of a collection plan in step S411, which is automatically calculated by the server apparatus 11, need not necessarily be executed between steps S409 and S412, and the collection plan may be created, for example, prior to the process in step S409, based on collection request information, including a requested collection schedule, stored in the DB 15. Furthermore, the arrangement may be such that the user 3 is prohibited from cancelling a scheduled collection within a predetermined number of days prior to a requested collection date; for example, a message saying "Note: Scheduled collection may not be cancelled within a week prior to scheduled date" is displayed on screen. In that case, the process in step S409 will be such, for example, that the server apparatus 11 creates a collection plan based on data stored in the DB 15 at that point of time, notifying the user terminal 31 of a collection schedule on the collection schedule screen shown in FIG. 21.

In this case, the user is allowed to request a collection schedule at least a predetermined number of days (e.g., one week) after the current date.

Then, the recovery center 1 collects used consumable products from the user 3 according to the collection plan created in step S411 (S412). Then, the server apparatus 11, or an information processing apparatus provided at the recovery center 1, reads a supplier code attached to each of the used consumable products that have been collected (hereinafter referred to as "collected products"), and the information that has been read is input to the server apparatus 11 (S413). Furthermore, the collected products are classified on the basis of the supplier code so that the collected products can be delivered to the corresponding suppliers 2 (step S413). Count information of the supplier code that has been read is input to the server apparatus 11 and stored in the DB 15 in association with the supplier code and date. Accordingly, the server apparatus 11 manages the number of products collected in a specific period and associated with the supplier code (collection record and quantity collected in the current month in the details of supplier information shown in FIG. 5).

The supplier code may be read, for example, by human visual inspection or an optical character reader (OCR) if the supplier code is text information, or by a laser bar code reader or a CCD area sensor if the supplier code is a bar code. The supplier code thus read is input to the server apparatus 11 together with associated supplier information. As for the classification of collected products, for example, collected products are carried on a belt conveyor to a classification apparatus, and the classification apparatus classified the collected products according to the supplier code read by the server apparatus 11 into classification boxes using partitions, etc. As another example, information in accordance with the supplier code read by the server apparatus 11 is displayed on a display unit so that a worker can recognize the information, allowing the worker, for example, to throw the collected products into predetermined classification boxes according to the displayed information.

Based on the result of the process in step S413, the server apparatus 11 updates recovery information including at least collection information in the DB 15, and manages recovery status information for each of the suppliers and recovery status information for each of the suppliers (step S414). That is, the information input to the server apparatus 11 in step S413 is stored and managed in the DB 15 as the latest information. The server apparatus 11 compiles and manages the recovery information stored in the DB 15, including the updated recovery information, for each of the suppliers and for each of the users.

Then, based on the recovery information, the server apparatus 11 notifies the supplier terminal 21 of the collection status information of the collected consumable products and other relevant recovery information via the communication link (step S415).

Furthermore, in step S415, the server apparatus 11 determines whether a predetermined number of products has been collected for the supplier 2, or whether a predetermined condition for scheduling a delivery has been satisfied. For example, a delivery/collection information screen as shown in FIG. 13 is supplied to and displayed on the supplier terminal 21 in step S415. The delivery/collection information screen shown in FIG. 13 will be described later in more detail.

Then, the recovery center 1 delivers the collected products to the supplier 2 (step S416). Alternatively, in step S416, when a predetermined condition has been reached in step S415, the recovery center 1 may send a request to the supplier 2 at the supplier terminal 21 via e-mail, etc. to pick up the collected products.

When the collected products have been delivered, the server apparatus 11 updates delivery information (delivery record, etc. in FIG. 5) in the supplier information in the DB 15. The update may be executed, for example, automatically when a scheduled delivery date is over, or when the server apparatus 11 is notified of completion of delivery by a person in charge of delivery, etc.

The supplier 2 processes the recovered products for recycling (step S417), attaches the supplier code to the reproduced consumable products (step S406), and supplies the consumable products to users 3 (step S407). It is to be understood that in step S407, new consumable products may also be supplied to the users 3.

Figure 17:
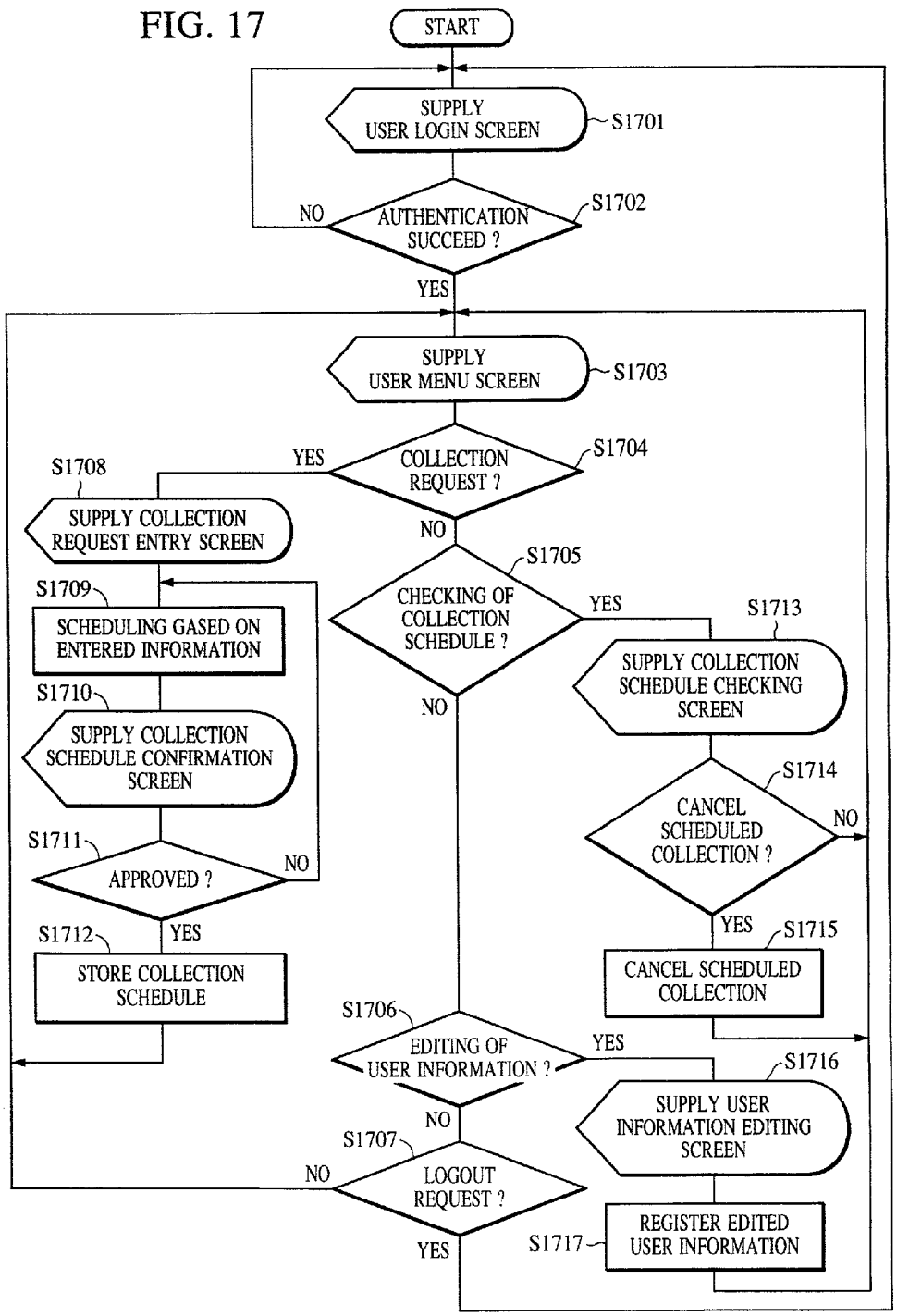
FIG. 17 is a flowchart showing a process that can be executed by a user accessing the server apparatus.

Furthermore, although not shown in FIG. 4, upon being notified that "Collection Record" button has been clicked on in the screen shown in FIG. 21 at any timing (collection schedule checking request in step S1705 shown in FIG. 17), the server apparatus 11 retrieves information regarding collection of consumables for the user of the user terminal 31 at the source of the request, and transmits the collection information to the user terminal 31 via the communication link (step S1713 in FIG. 17). The user at this time is recognized by the server apparatus 11 when the user terminal 31 logs in.

Data Structure in DB

Figure 5:
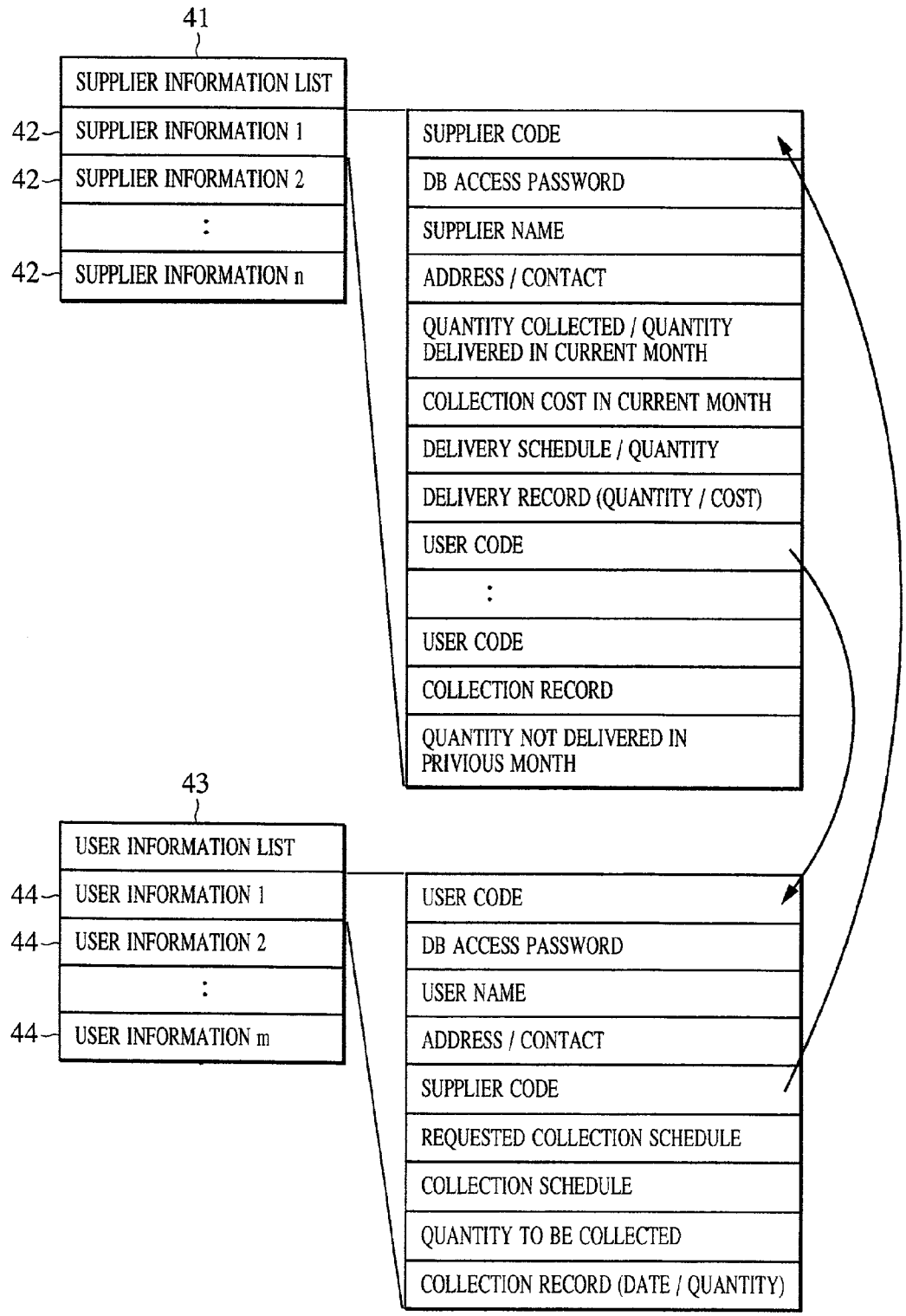
FIG. 5 is a diagram showing an example data structure in a database.

FIG. 5 is a diagram showing an example of data structure in the DB 15. The data is stored in a storage unit of the server apparatus 11, and the storage unit corresponds to the secondary storage unit 2505 shown in FIG. 3.

Figure 12:
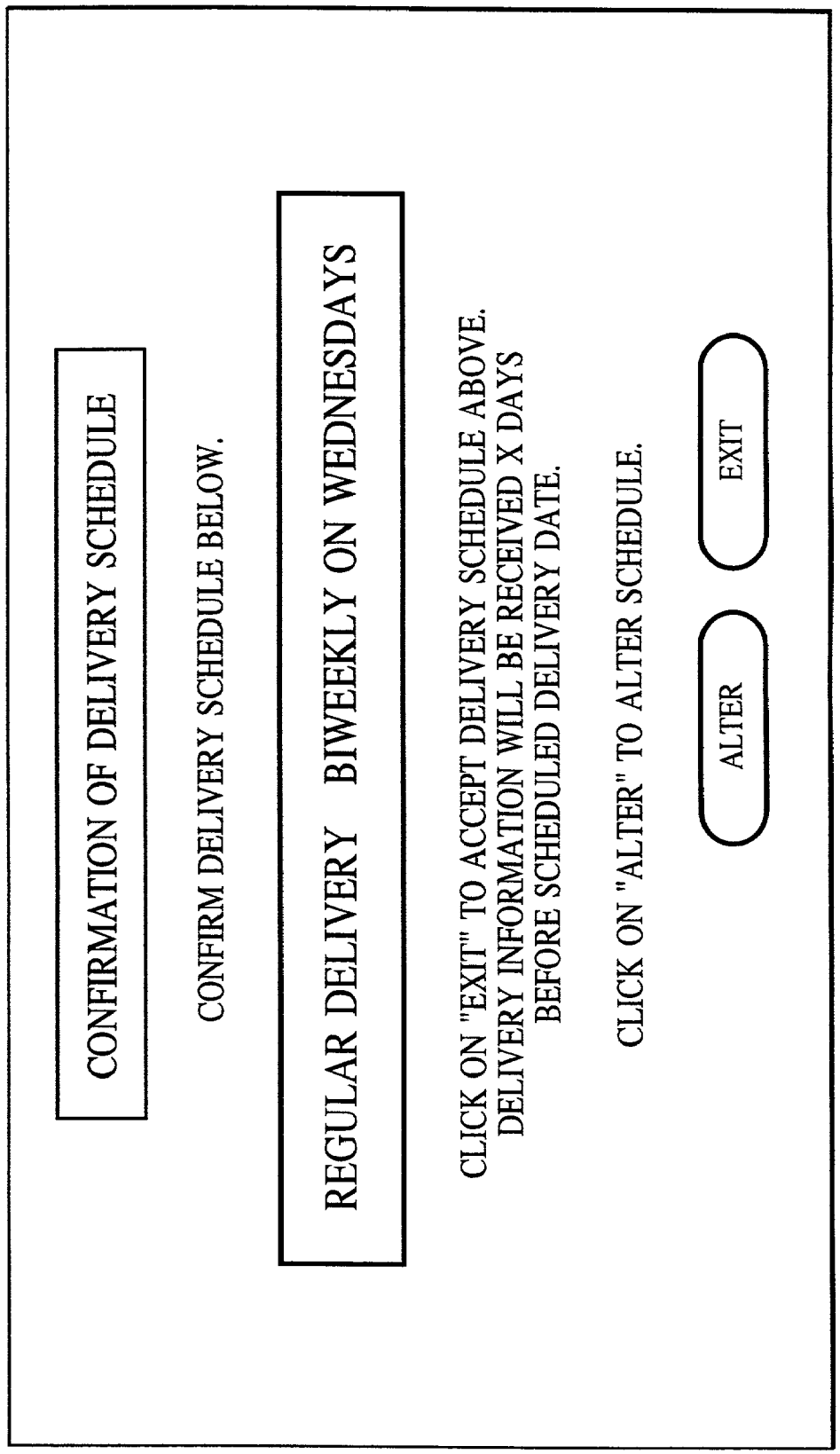
FIG. 12 is a diagram showing an example of delivery schedule confirmation screen.

In a supplier information list 41, supplier information 42 is added each time new supplier information is registered via the supplier information registration/editing screen shown in FIG. 9. Similarly, to a user information list 43, user information 44 is added each time new user information is registered via the user information registration/editing screen shown in FIG. 12.

Each supplier information 42 at least includes a supplier code, a DB access password, a supplier name, an address/contact (phone number, facsimile number, e-mail address, etc.), quantity collected/quantity delivered in the current month, recovery cost in the current month, delivery schedule and quantity, delivery record (quantity and cost), and a user code corresponding to user information registered by the supplier 2. The supplier information 42 is not limited to information associated with a manufacturer, and may be associated with a dealer that sells consumable products or an organization that recovers consumable products, as described earlier.

Each user information 44 at least includes a user code, a DB access password, a user name, an address and contact information (phone number, facsimile number, e-mail address, etc.), a requested collection schedule, a collection schedule, quantity to be collected, collection record (date and quantity), and a supplier code of the supplier 2 that has registered the user information. That is, the supplier information 42 and the user information 44 are linked with each other via the supplier code and the user code. The user information 44 is not limited to information associated with an individual user of an image forming apparatus, such as a printer, in which consumable products are used, and may be associated with a dealer that sells and collects consumable products, or an agent that collects consumable products on behalf of a supplier.

Figure 18:
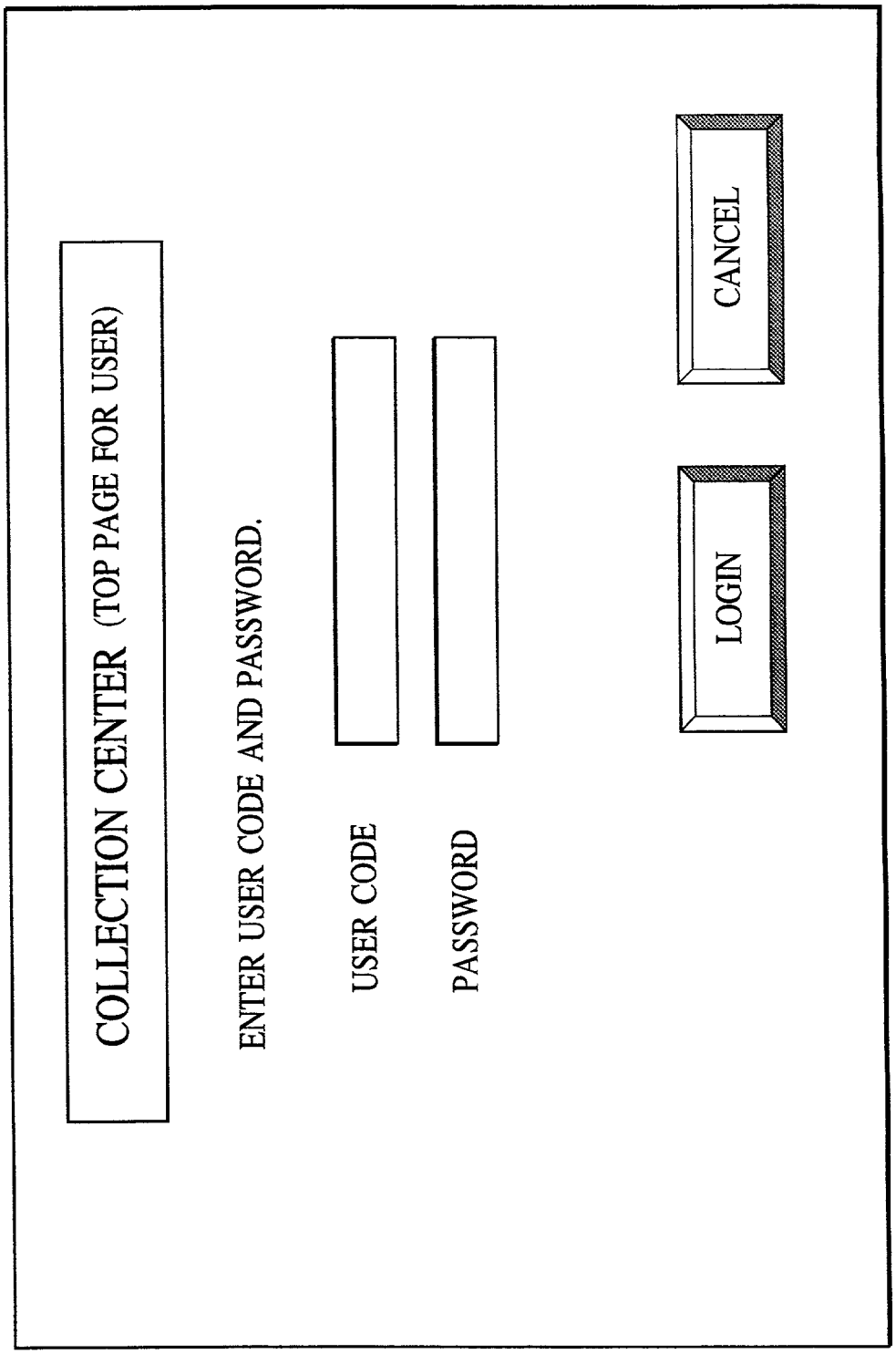
FIG. 18 is a diagram showing an example of user login screen.

As described above, in addition to storing recovery records, the DB 15 manages recovery information for each user and recovery information for each supplier, with reference to identification information input from external apparatuses via user interface screens shown in FIGS. 8 and 18 and to be described later. That is, when identification information of a user is input, recovery information (e.g., collection record, etc. in the details of user information shown in FIG. 5) of the corresponding user is supplied to a user terminal 31 of the user, whereas when identification information of a supplier is input, recovery information (e.g., delivery record, collection record, etc. in the details of the supplier information in FIG. 5) of the corresponding supplier is supplied to a supplier terminal 21 of the supplier 2.

Processes Provided for Supplier

Figure 6:
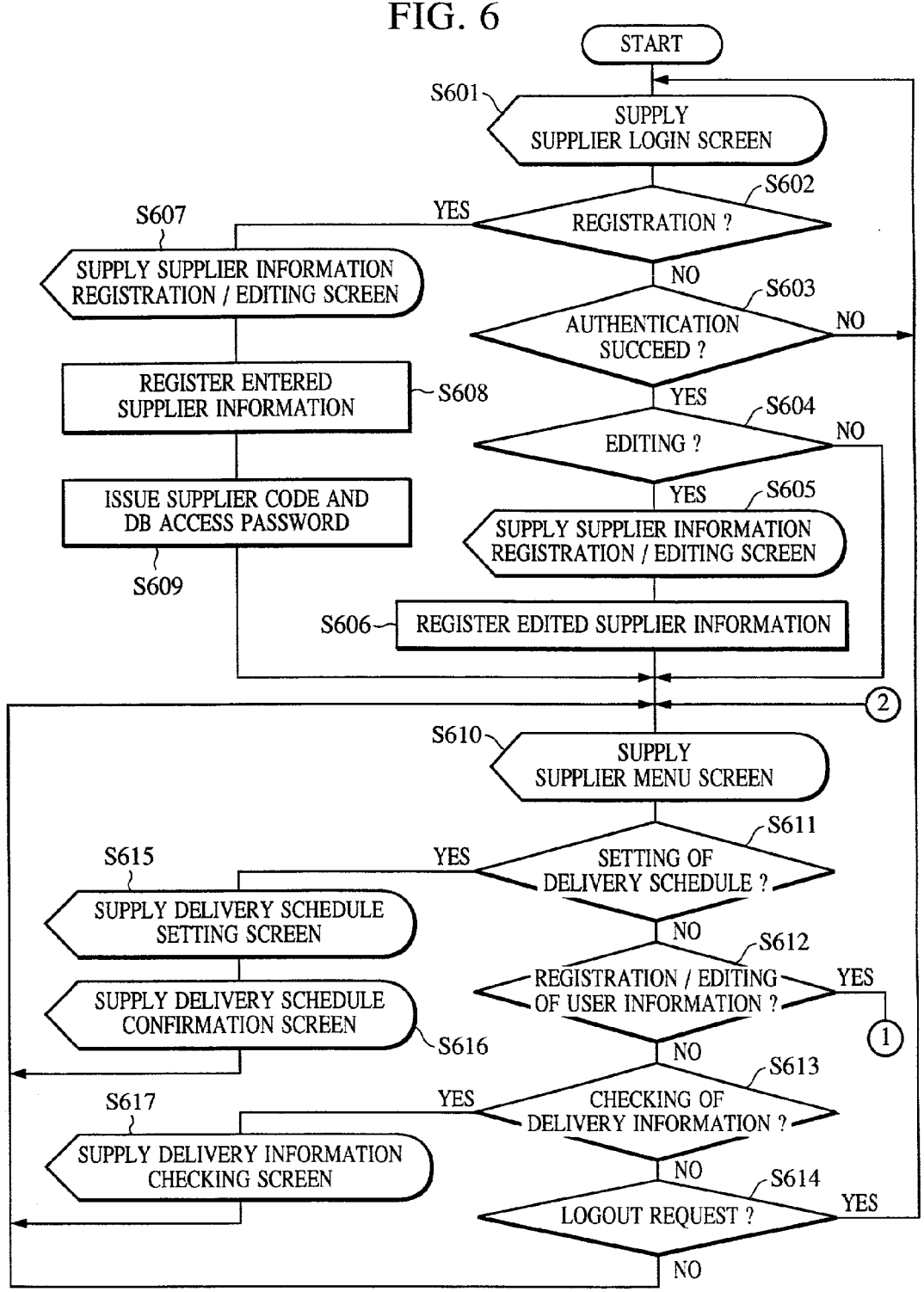
FIG. 6 is a flowchart showing a process that can be executed by a supplier accessing the server apparatus.
Figure 7:
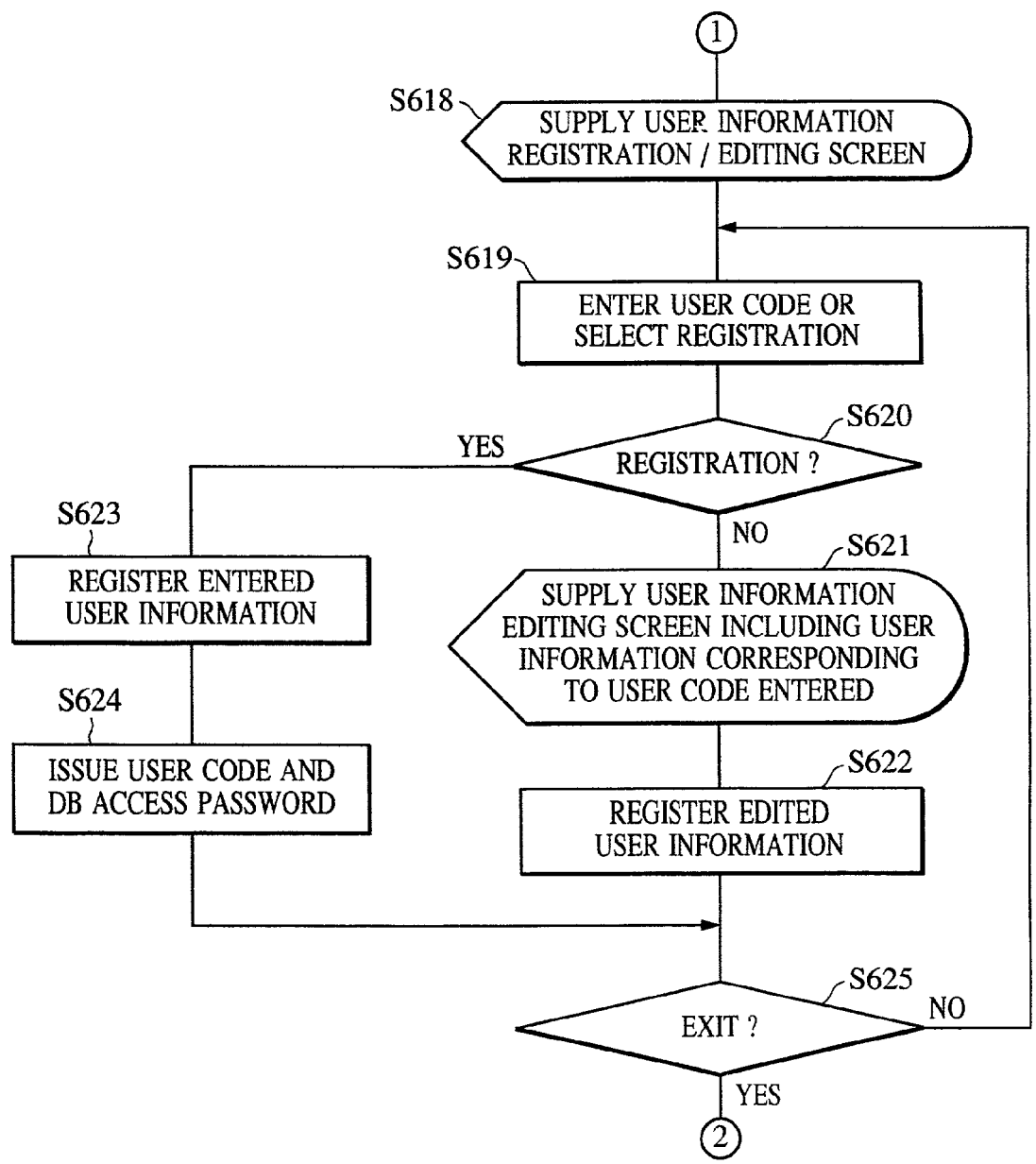
FIG. 7 is a flowchart showing a process that can be executed by the supplier accessing the server apparatus.

FIGS. 6 and 7 are flowcharts showing processes that can be executed by the terminal apparatus 21 of the supplier 2 accessing the server apparatus 11. It is to be understood that the processes shown in FIGS. 6 and 7 are executed by the server apparatus 11 processing information entered or selected by the supplier 2 on screens supplied from the server apparatus 11 to the supplier terminal 21.

Login Screen

Figure 8:
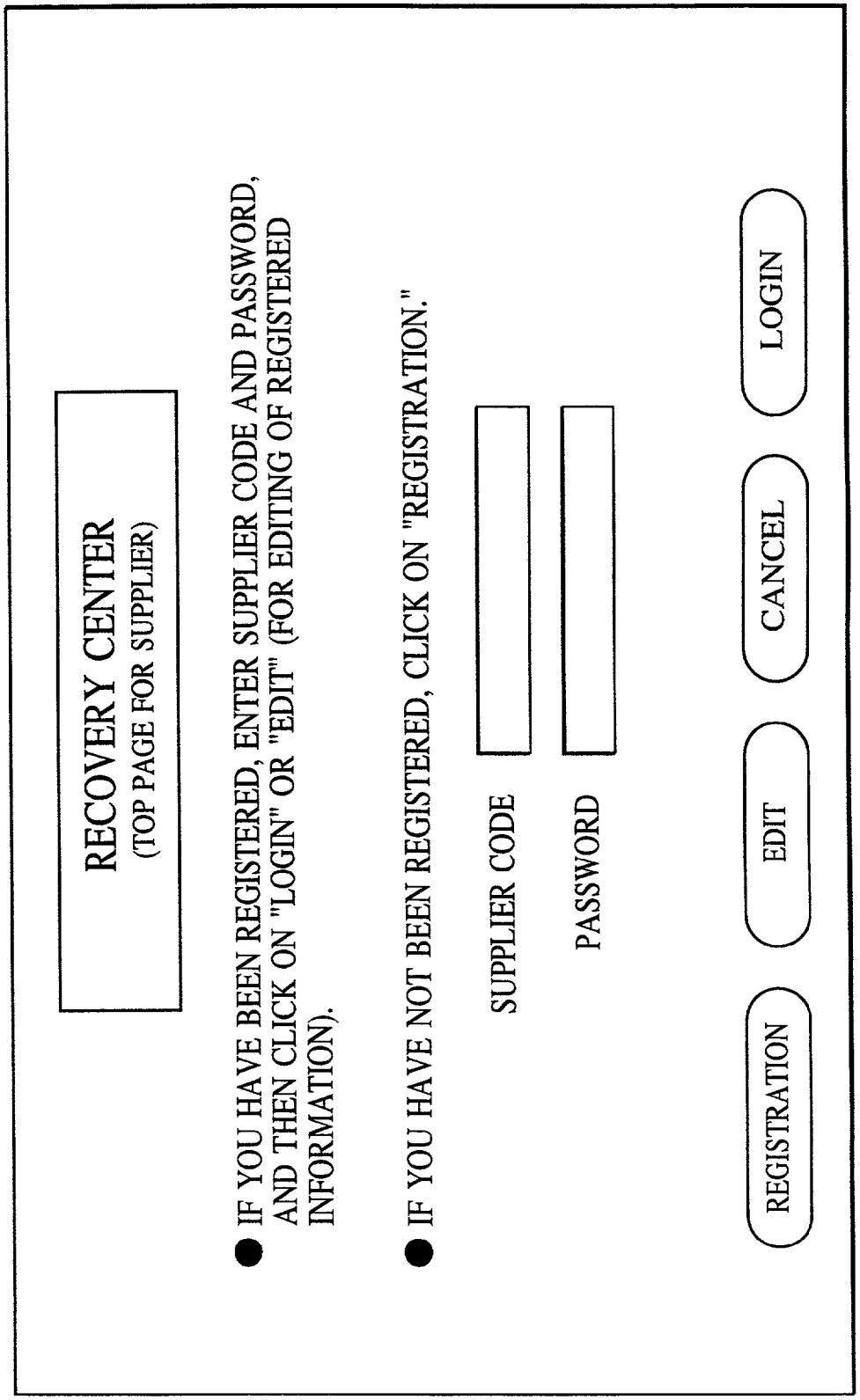
FIG. 8 is a diagram showing an example of supplier login screen.

When the supplier 2 accesses the server apparatus 11 from the supplier terminal 21, a supplier login screen shown in FIG. 8 is supplied and displayed on the supplier terminal 21 (step S601). If the supplier 2 has already been registered, the supplier 2 enters its supplier code and DB access password and then clicks on "Login" or "Edit" button. Then, information indicating the selection of one of the buttons is transmitted from the supplier terminal 21 to the server apparatus 11 via a predetermined communication link. If the supplier 2 has not been registered yet, the supplier 2 clicks on "Registration" button, so that information indicating a registration is transmitted from the supplier terminal 21 to the server apparatus 11.

The server apparatus 11 receives information transmitted from the supplier terminal via the communication link, determining whether the information relates to either entry of a supplier code and a DB access password and a click on "Login" or "Edit" button, or a click on "Registration" button, branching to a corresponding process accordingly (step S602).

Login

If it is determined that "Login" button or "Edit" button has been clicked on in step S601, the server apparatus 11 executes a login authentication process based on the supplier code and the DB access password input thereto and the associated supplier information 42 stored in the DB 15 (step S603). If the supplier 2 is identified as having been registered, the server apparatus 11 further determines whether "Login" button or "Edit" button has been clicked on (step S604). If it is determined that "Login" button has been clicked on, the process proceeds to step S610. If the supplier 2 is not identified as a registered supplier, a dialog with an alert message is supplied to the supplier terminal 21 to prompt the supplier 2 to enter its supplier code and DB access password again.

Editing of Supplier Information

If it is determined in step S604 that "Edit" button has been clicked on, the server apparatus 11 supplies a supplier information registration/editing screen (FIG. 9) including the registered supplier information of the supplier 2 to the supplier terminal 21 (step S605). The supplier 2 edits the supplier information as required on the Supplier information registration/editing screen, and then clicks on "Register" button. Then, the supplier terminal 21 transmits the edited information to the server apparatus 11, and the server apparatus 11 stores the edited supplier information in the DB 15 (step S606).

Registration of Supplier Information

If it is determined in step S602 that "Registration" button has been clicked on, the server apparatus 11 supplies a supplier information registration/editing screen (FIG. 9) to the supplier terminal 21 (step S607). The supplier 2 enters its name, address, contact information (phone number, facsimile number, e-mail address, etc.) on the supplier information registration/editing screen, and then clicks on "Register" button. In response thereto, the supplier terminal 21 transmits the entered information to the server apparatus 11, and the server apparatus 11 generates a supplier code and a DB access password based on the entered information of the supplier 2, and stores as new supplier information 42 in the DB 15 (step S608). The server apparatus 11 also supplies a screen including the supplier code and the DB access password to the supplier terminal 21 (step S609).

When the screen including the supplier code and the DB access password is displayed on the supplier terminal 21, and when the supplier 2 confirms the supplier code and the DB access password, and then clicks on "OK" button, the server apparatus 11 proceeds to step S610. If the supplier 2 clicks on "Cancel" button instead of "OK" button, although not shown, the supplier information registration/editing screen (FIG. 9) is initialized, and the supplier information 42 stored in the DB 15 in step S608 is deleted.

Menu Screen

In step S610, the server apparatus 11 supplies a supplier menu screen (FIG. 10) to the supplier terminal 21. The supplier menu screen (FIG. 10) shows operations that can be performed by a supplier 2 accessing the server apparatus 11, and includes "Delivery Schedule Setting," "Registration/Editing of User Information," "Check Delivery/Collection Information," and "Logout" buttons. The server apparatus 11 branches to one of the corresponding processes (steps S611 to S614) according to which button has been clicked on by the supplier 2 at the supplier terminal 21.

Setting of Delivery Schedule

When "Delivery Schedule Setting" button is clicked, the server apparatus 11 supplies a delivery schedule setting screen (FIG. 11) to the supplier terminal 21 (step S615). The supplier 2 is allowed to select on the delivery schedule setting screen either regular delivery (e.g., on a particular day of each month, a particular day of each week, or a particular day of every other week), or non-regular delivery (e.g., at the time of each collection and classification or when a predetermined container is full).

When the supplier 2 sets a delivery schedule and clicks on "OK" button, the server apparatus 11 supplies a delivery schedule confirmation screen (FIG. 12) to the supplier terminal 21 (step S616). When the supplier 2 clicks on "Exit" button, the server apparatus 11 enters the delivery schedule in the DB 15, and supplies the supplier menu screen (FIG. 10) to the supplier terminal 21 (step S610). If the supplier 2 clicks on "Alter" button, the server apparatus 11 supplies the delivery schedule setting screen (FIG. 11) again to the supplier terminal 21 (step S615). The delivery schedule setting information set in the delivery schedule setting screen supplied in step S615 is transmitted from the supplier terminal 21 to the server apparatus 11, and managed (storage unit) in the DB 15 of the server apparatus 11. A CPU of the server apparatus 11 determines at a predetermined interval whether a predetermined condition for delivery has been satisfied. If it is determined that the condition for delivery has been satisfied, a delivery instruction is issued (e.g., an e-mail including a delivery instruction is sent to a delivery management server). The delivery instruction may be executed by a delivery vehicle owned by the recovery center 1, by transmitting a request to the supplier terminal 21 of the supplier of the consumable products for picking up the consumable products by a vehicle, or by transmitting a request to a terminal apparatus of a predetermined delivery agent for delivering the consumable products to the supplier 2.

As described above, by providing suppliers of consumable products with a setting screen that allows the suppliers to set delivery schedules, a plurality of manufactures benefits from delivery methods in accordance with their respective businesses, and thus a flexible system for unitarily managing consumable products supplied by a plurality of suppliers is achieved.

Checking of Delivery/Collection Information

Figure 10:
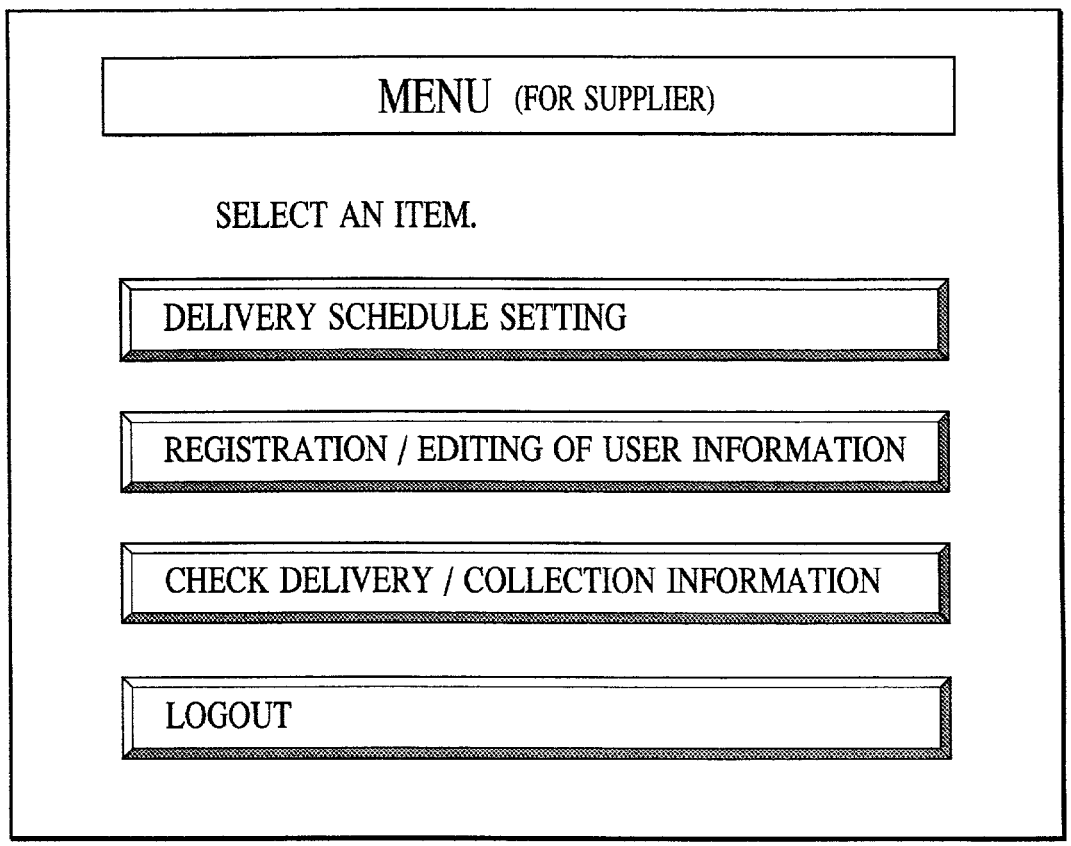
FIG. 10 is a diagram showing an example of supplier menu screen.

Upon being notified from the supplier terminal 21 that "Checking of Delivery/Collection Information" button shown in FIG. 10 has been clicked on, the server apparatus 11 determines that a delivery/collection information checking screen has been requested in step S613, and transmits a delivery/collection information checking screen to the supplier terminal 21 in step S617. FIG. 13 shows an example of delivery/collection information checking screen. The delivery/collection information checking screen shown in FIG. 13 is generated by identifying the supplier 2 based on the request for the delivery/collection information checking screen, and with reference to information managed in the DB 15 in association with the identified supplier 2. The delivery/collection information checking screen allows the supplier 2 to check collection status, collection schedule, and schedule for delivery if collected products by the recovery center 1.

The delivery/collection information checking screen shows various information at least including schedule for delivering collected products in each period. Table 1 below shows correspondence between values shown in the delivery/collection schedule screen and the supplier information 42 in the DB 15 shown in FIG. 5.

TABLE 1

| Display section on screen | Field in supplier information |
| --- | --- |
| Quantity collected this month | Quantity collected in current month |
| Quantity collected in total | Quantity collected in current month + delivery record quantity |
| Quantity delivered this month | Quantity delivered in current month |
| Quantity to be collected | (Note) |
| Delivery schedule | Delivery schedule/quantity |

(Note)
Quantity to be collected indicates the number of products scheduled for collection but not yet actually collected, according to the user information 44 associated with the user code included in the supplier information 42.

Information displayed on each section of the delivery/collection information checking screen shown in FIG. 13 will be described below. The quantity-collected-this-month section shows the number of consumable products actually collected by the recovery center 1 in a period (month) specified by the supplier 2.

The quantity-collected-in-total section shows the total number of consumable products that have been collected so far. The quantity-delivered-this-month section indicates the number of products collected temporarily at the recovery center 1 and returned to the supplier 2 in the specified period.

The quantity-to-be-collected section shows the number of consumable products requested by a user for collection but not actually collected yet. Alternatively, the section may show the number of consumable products requested for collection but not actually collected yet in a period specified by the supplier 2 (May in FIG. 13). In that case, the quantity to be collected is obtained by subtracting the number of products associated with May 17 and subsequent dates from the quantity to be collected (130) in FIG. 13.

The quantity-to-be-delivered section shows the sum of the number of products that have been collected but not delivered to the supplier 2 yet and the number of products that have been requested by a user for collection but not collected yet by the delivery date.

Figure 31:
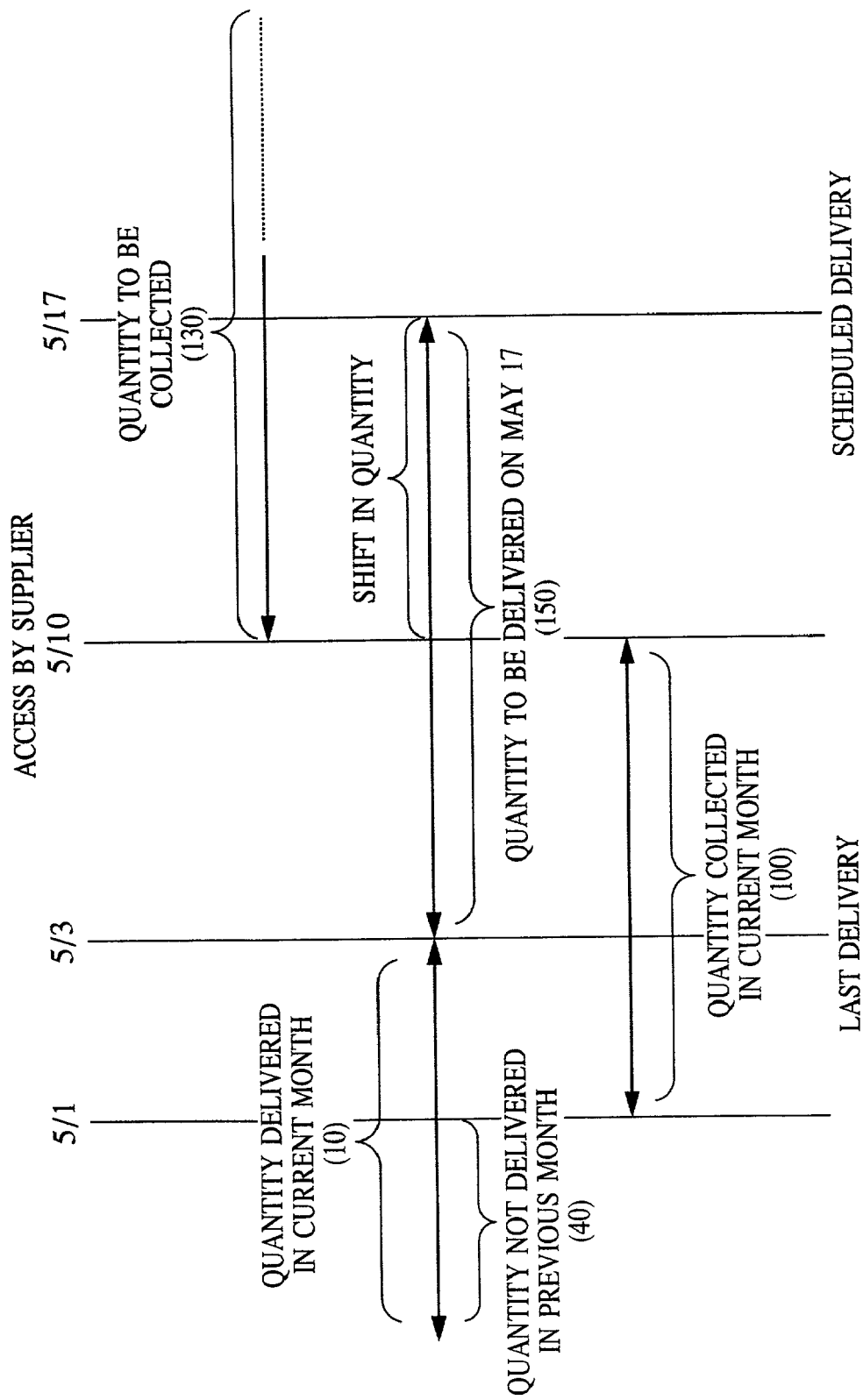
FIG. 31 is a diagram for explaining the contents of the delivery information checking screen shown in FIG. 13.

FIG. 31 is a diagram showing relationships among information items shown in FIG. 13 and Table 1 more clearly.

FIG. 31 shows relationships among the quantity collected in the current month, quantity delivered in the current month, quantity to be collected, quantity to be delivered, quantity not delivered in the previous month, and shift in quantity. Dates shown in FIG. 31 correspond to dates shown in FIG. 13. The quantity to be collected is the number of products stored in the DB 15 as having been requested for collection since the date of a user's access to the server apparatus 11 for a checking delivery/collection information checking request (5/17, 5/31, 6/13, etc.)

For example, quantity to be delivered on May 17 (indicated by an arrow from 5/3 to 5/17) indicates the sum of quantity collected to the recovery center 1 in the current month but not yet delivered to the supplier 2 and quantity requested for collection in a period from the date on which the supplier 2 accessed the server apparatus 11 (5/10) to the delivery date (5/17) (corresponding to shift in quantity in FIG. 31). The supplier 2 is allowed to view the screen shown in FIG. 13 to check collection status and collection schedule in the future substantially in real time. This facilitates, for example, creation of a production plan and promotion of consumable products. Furthermore, the server apparatus 11 may perform such a control operation that information such as delivery cost in FIG. 5 will be displayed on the screen shown in FIG. 13.

In the screen shown in FIG. 13, when the supplier 2 clicks on "Delivery Record" button to reference past delivery records, the server apparatus 11 supplies a delivery record screen (not shown) to the supplier terminal 21. The delivery record screen shows a list of delivery records of the supplier information 42 in the DB 15 month by month. If "Close" button is clicked on, the server apparatus 11 supplies the menu screen (FIG. 10) to the supplier terminal 21.

Furthermore, the supplier 2 may be provided with such an arrangement that timing for transmitting the delivery information shown in FIG. 13 to the supplier terminal 21 via the communication link can be specified.

That is, similarly to the delivery schedule setting screen shown in FIG. 11, a screen for setting timing for reporting delivery information (including information regarding quantity collected) may be provided. The screen shown in FIG. 11 can be used as such a screen for setting timing for reporting delivery information by replacing "regular delivery" and "non-regular deliver" with "regular reporting" and "non-regular reporting," respectively. Furthermore, by allowing setting of an interval of regular reports that is shorter than the interval of delivery schedule notifications, for example, every one hour, the supplier 2 is allowed to check collection status at the recovery center 1 substantially in real time.

By implementing the arrangement that has been described with reference to FIGS. 6, 11, and 13, identification information identifying one of a plurality of suppliers is input on an external information processing apparatus (the user terminal 31) and transmitted therefrom via a predetermined communication link (step S603), collection information associated with the identification information is extracted from the DB 15 (FIG. 5), and the extracted collection information is transmitted to the information processing apparatus via the communication link (step S617). Thus, each supplier is allowed to readily retrieve delivery/collection information associated with it from unitarily managed delivery/collection information associated with a plurality of suppliers. In another perspective, since the server apparatus 11 unitarily manages delivery/collection information, a more efficient management system can be implemented compared with a case where each supplier individually manages delivery/collection information. Furthermore, since delivery schedule can be set specifically via the setting screen shown in FIG. 11, collected products can be delivered to different suppliers on different schedules as desired.

Furthermore, by providing the delivery/collection information checking screen, each supplier is allowed to check quantity to be delivered in each period, so that creation of a production plan and procurement of parts will be facilitated. In addition, quantity to be collected in the future can be predicted using past delivery records and quantity collected in total stored in the DB 15 at the recovery center 1.

Although the screen shown in FIG. 13 has been described in relation to a delivery schedule for a specific supplier, collection and delivery works are actually performed for each a plurality of suppliers. Thus, collection and delivery are performed as needed for one or more suppliers and/or one or more users.

Logout

Upon being notified from the server apparatus 11 via the communication link that "Logout" button has been clicked on in the menu screen (FIG. 10), the server apparatus 11 returns to the initial process and supplies the supplier login screen (FIG. 8) to the supplier terminal 21 (step S601).

Registration and Editing of User Information

When "Registration/Editing of User Information" button is clicked on in the menu screen (FIG. 10), the server apparatus 11 supplies a user information registration/editing screen (FIG. 14) to the supplier terminal 21 (step S618).

As described earlier, when a user 3 to which consumable products are to be supplied is determined, the supplier 2 registers information of the user 3 in the DB 15. The registered user information needs to be changed when, for example, the location of the user 3 has been changed. In that case, the supplier 2 edits the registered user information on the user information registration/editing screen.

Information entered in the user information registration/editing screen shown in FIG. 14 is managed as registered information in the supplier information list 41 and the user information list 43 stored in the DB 15.

In the user information list 43 shown in FIG. 5, information associated with a user name entered via the user interface screen shown in FIG. 14 is stored. Furthermore, information such as an address, phone number, facsimile number, e-mail address is stored in "address/contact" field of the user information list 43. It is to be understood that the address/contact filed may be divided into an address field, phone number field, facsimile number field, and e-mail address field. The entry of the information in the DB 15 is executed by the server apparatus 11 in response to a click on "Register" button in the user information registration/editing screen on the supplier terminal 21 and transmission of the entered information from the supplier terminal 21 to the server apparatus 11 via a predetermined communication link.

The supplier information list 41 stores a user code in association with the supplier code. The supplier 2 enters a user code corresponding to user information to be edited in a user code field of the user information registration/editing screen. The user code may be selected from a drop-down menu of the user code field. It is also possible to select registration to register a new user. The drop-down menu lists registration and user codes included in the supplier information list 41.

Furthermore, it is also possible to search for particular user information by entering partial information such as user name and part of phone number and clicking on "Search" button.

When a user code or registration is set in the user code field (step S619), the server apparatus 11 determines whether the instruction is for registration or for editing (step S620). In the case of editing, the server apparatus 11 supplies a user information registration/editing screen including user information corresponding to the user code set in the user code field to the supplier terminal 21 (step S621). The supplier 2 edits the user information as required and then clicks on "Register" button. The server apparatus 11 stores the edited user information in the DB 15 (step S622).

In the case of registration, the supplier 2 enters user information such as user name, address, contact information (phone number, facsimile number, and e-mail address) on the user information registration/editing screen and then clicks on "Register" button. The server apparatus 11 generates a user code and a DB access password based on the user information entered, and stores new user information 44 in the DB 15 (step S623). The server apparatus 11 also supplies a screen including the user code to the supplier terminal 21 (step S624).

When the screen including the user code is displayed on the supplier terminal 21, and the supplier 2 confirms the user code and then clicks on "OK" button, the server apparatus 11 proceeds to step S627. If the supplier 2 clicks on "Cancel" button instead of "OK" button, although not shown, the user information registration/editing screen (FIG. 14) is initialized, and the user information 44 stored in the DB 15 in step S623 is deleted. Only the user 3, and not the supplier 2, is notified of the DB access password.

If "Close" button is clicked on in step S627, the server apparatus 11 exits the user information registration/editing process, and returns to step S610. Although it has been described that whether "Close" button has been clicked on is determined only in step S627, "Close" button can be clicked on anytime when the user information registration/editing screen is displayed on the supplier terminal 21. That is, the supplier 2 is allowed to continue registration or editing of user information until it clicks on "Close" button. If "Close" button is clicked on with information to be registered or edited yet to be determined, the information yet to be determined is discarded.

Supplier Code

Figure 15:
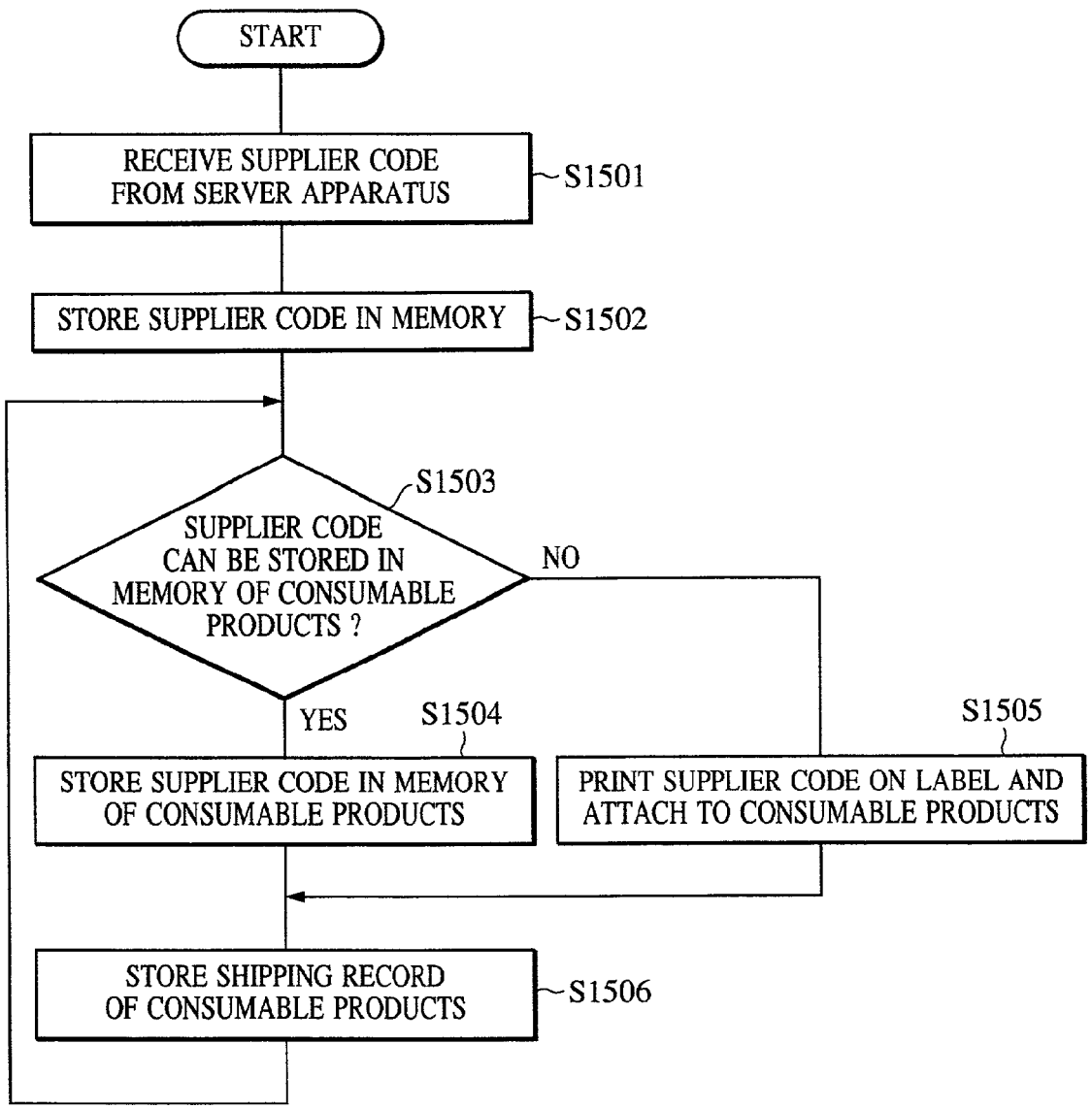
FIG. 15 is a flowchart showing a process to be executed by a suitable information processing apparatus provided at a site of the supplier.

FIG. 15 is a flowchart showing a process to be executed by the supplier terminal 21 or a suitable information processing apparatus provided at a site of the supplier 2 after the supplier terminal 21 is notified of the supplier code from the server apparatus 11. More specifically, FIG. 15 shows the processes executed in steps S402 and S406 shown in FIG. 4.

When the supplier code is received from the server apparatus 11 (step S1501), the supplier code is stored in a non-volatile memory of the supplier terminal 21 or a suitable information processing apparatus (step S1502).

Then, for example, just before shipping of a consumable product, it is determined whether the consumable product has a memory and whether the supplier code is in a form that can be stored in the memory of the consumable (step S1503).

If it is determined that the consumable product has a memory and that predetermined information can be stored in the memory, the supplier code is stored in the memory of the consumable product by a predetermined information processing apparatus (step S1504). As the memory of the consumable product, a non-volatile memory such as an EEPROM (electrically erasable programmable read-only memory) is used.

Figure 16A:
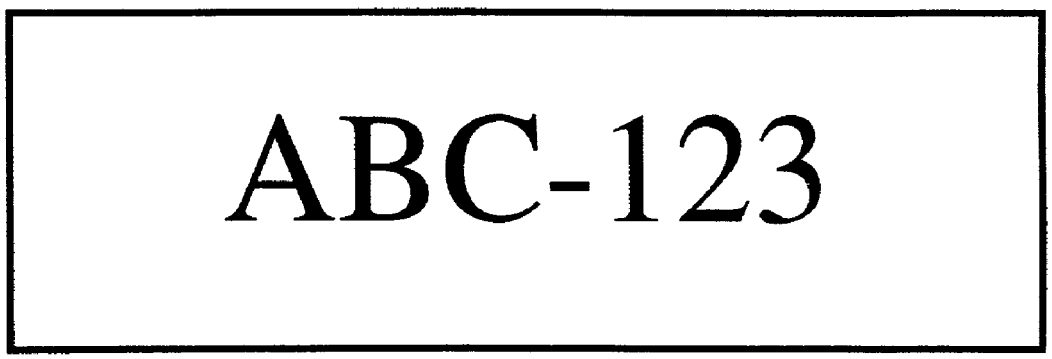
FIGS. 16A to 16C are diagrams are diagrams showing example labels on which a supplier code is printed.
Figure 16B:
Figure 16C:
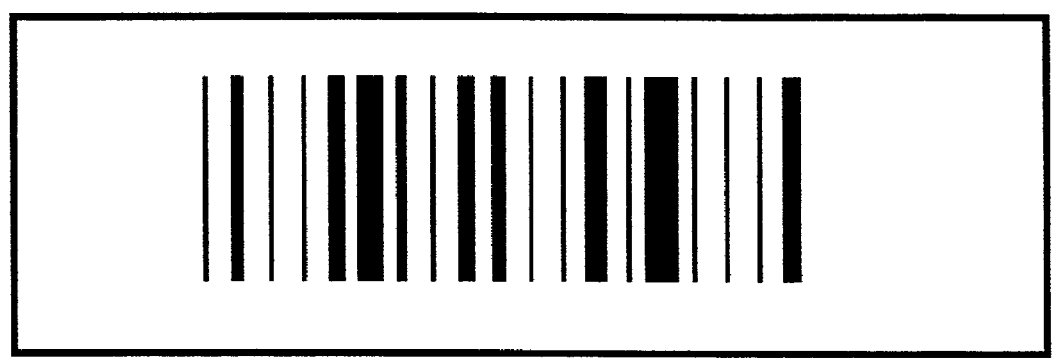

On the other hand, if it is determined that the consumable product does not have a memory or the supplier code cannot be stored in a memory of the consumable product, a label with the supplier code printed thereon by a printing apparatus, such as ones shown in FIGS. 16A to 16C, is attached to the consumable product (step S1505). By using a sheet or a film with an adhesive coated on a bottom surface (non-print surface) thereof as a medium for the label, the label can be readily attached to the consumable product. FIGS. 16A to 16C show three examples of supplier code. Referring to FIGS. 16A and 16B, respectively, the labels show "ABC-123" and "Canxn" in a manner recognizable by human visual inspection, so that consumable products collected at the recovery center 1 can be classified by visual inspection by a worker. FIG. 16C shows an example of bar code printed on a label, so that information will be read by a bar code reader and entered in the server apparatus 11 for management in association with consumable products collected at the recovery center 1.

The supplier codes managed in the server apparatus 11 and the supplier codes shown in FIGS. 16A to 16C need not necessarily coincide with each other (obviously, they may coincide), and the objects of the present invention can also be achieved by storing and managing information in the server apparatus 11 in association with the printed supplier codes shown in FIGS. 16A to 16C. For example, "ABC-123" shown in FIG. 16A may be associated with a serial number, which is stored and managed in the DB 15 of the server apparatus 11.

Then, a shipping record of the consumable product in which the supplier code has been stored, or to which a label with the supplier code printed thereon is attached, is recorded in the non-volatile memory of the supplier terminal 21 or the suitable information processing apparatus (step S1506). The processes in steps S1503 to S1506 are repeated each time consumable products are shipped or manufactured.

By storing a supplier code in the memory of each consumable product or attaching a label with a supplier code printed thereon to each consumable product, an associated supplier 2 can be readily identified from each collected product, serving to achieve smooth classification and delivery of collected products. In order to read supplier codes, an apparatus for reading information from the memory of each consumable product, a bar code reader or an OCR (optical character reader) for reading bar codes or text strings (or symbol strings) printed on labels such as ones shown in FIGS. 16A to 16C are provided at the recovery center 1. Supplier codes read from collected products are stored in the DB 15 via the server apparatus 11, and used, for example, for checking of delivery information described earlier.

If the medium for the labels on which supplier codes are to be printed is not coated with an adhesive, for example, a medium on which a supplier code is printed is packed together with a consumable product, for example, in a packaging box for the consumable product.

As described above, by issuing supplier codes for identifying suppliers 2 of collected products, each consumable product can be shipped with a supplier code for identifying an associated supplier 2. The recovery center 1, which collects and unitarily manages used consumable products, can readily determine, based on the supplier codes, which collected products are to be delivered to which suppliers 2. Accordingly, recovery of used consumable products associated with a plurality of suppliers 2 is unified, achieving an efficient recovery system.

Processes Provided for User

FIG. 17 is a flowchart showing a process that can be executed by a user 3 accessing the server apparatus 11. It is to be understood that the process shown in FIG. 17 is achieved by the server apparatus 11 processing information entered or selected by the user 3 on screens supplied from the server apparatus 11 to the terminal apparatus 31 of the user 3.

Login

When the user 3 accesses the server apparatus 11 from the user terminal 31, a user login screen (FIG. 18) is displayed on the user terminal 31 (step S1701). The user 3 enters its user code and DB access password on the user login screen, and then clicks on "Login" button.

When "Login" button is clicked on, the server apparatus 11 executes a login authentication based on the entered user code and DB access password and user information 44 stored in the DB 15 (step S1702). If the user 3 is found to have been registered, the server apparatus 11 supplies a user menu screen (FIG. 19) to the user terminal 31 (step S1703). If the user 3 is not found to have been registered, a dialog with an alert (not shown) is supplied to the user terminal 31 to prompt the user to enter its user code and DB access password again.

The user menu screen shows operations that can be performed by the user 3 accessing the server apparatus 11. The user menu screen includes "Editing of User Information," "Collection Request," "Checking of Collection Schedule," and "Logout" buttons, and the server apparatus 11 branches to one of the corresponding processes (steps S1704 to S1707) according to which of the buttons has been clicked on.

Collection Request

Upon being notified from the user terminal 31 via a communication link that "Collection Request" button has been clicked on, the server apparatus 11 supplies a collection request entry screen to the user terminal 31 (step S1708). The collection request entry screen allows the user 3 to request collection of used consumable products. More specifically, a desired schedule for collection is entered in a corresponding entry field in FIG. 20, and a quantity desired to be collected is input in the a corresponding entry field, so that the contents that have been entered are included in the collection request. Furthermore, although not shown, the arrangement of the collection request entry screen may be such that a plurality of choices, for example, a first choice and a second choice, of desired collection schedule is allowed to be entered, so that creation of a collection plan by the server apparatus 11 will be facilitated.

When the user 3 has entered a desired schedule and quantity of collection and clicked on "Submit" button, the information entered on the user terminal 31 is transmitted to the server apparatus 11 via a predetermined communication link. Upon receiving the information, the server apparatus 11 stores the information in the requested collection schedule field and the quantity-to-be-collected field in the user information 44 stored in the DB 15 (step S1709). The server apparatus 11 then supplies a collection schedule confirmation screen including a collection schedule for the collection request from the user 3 to the user terminal 31 (step S1710). The server apparatus 11 usually returns the collection schedule desired by the user 3 as the collection schedule; however, for example, if the desired collection schedule falls on a non-working day of the recovery center 1, the server apparatus 11 returns the next working day as a collection schedule to the user terminal 31.

The user 3 clicks on "OK" button to approve of the collection schedule in the collection schedule confirmation screen displayed on the user terminal 31, and otherwise clicks on "Reset" button. The server apparatus 11 is notified of which of the buttons has been clicked on. If "Reset" button has been clicked on, all the values on the screen are cleared so that the user 3 is allowed to enter a desired collection schedule and quantity again.

If "OK" button is clicked on (step S1711), the server apparatus 11 copies the value in the requested collection schedule field in the user information 44 to the collection schedule field, whereby the collection schedule is fixed. Furthermore, the server apparatus 11 adds the value in the quantity-to-be-collected field in the user information 44 to the value in the quantity-to-be-delivered field in the supplier information 42 associated with the value in the supplier code field in the user information 44 (step S1712).

If "Close" button on the collection request entry screen is clicked on, upon being notified via the communication link that "Close" button has been clicked on, the server apparatus 11 discards information yet to be determined, and returns to step S1703 (display of the user menu screen).

Checking of Collection Schedule

Figure 19:
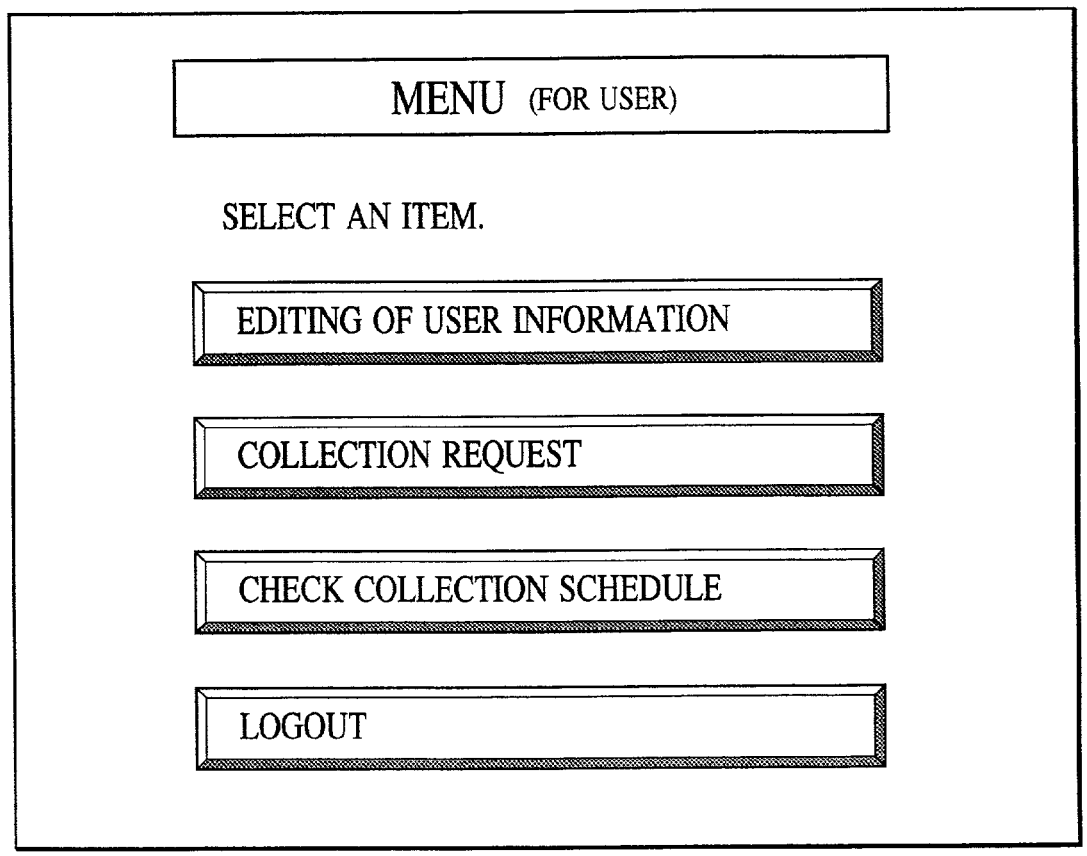
FIG. 19 is a diagram showing an example of user menu screen.

When the user 3 clicks on "Checking of Collection Schedule" button in the menu screen shown in FIG. 19 at the user terminal 31, information indicating a click on the button is transmitted to the server apparatus 11 via the communication link. Then, the server apparatus 11 supplies a collection schedule checking screen (FIG. 21) to the user terminal 31 via the communication link (step S1713). The collection schedule checking screen allows the user 3 to check a collection schedule (date and time, and quantity to be collected) displayed on a display unit of the user terminal 31.

If the user 3 desires cancelling of the schedule collection, the user 3 clicks on "Cancel Collection" button. In step S1714, it is determined whether "Cancel Collection" button has been clicked on. If information indicating a click on "Cancel Collection" button is transmitted from the user terminal 31 to the server apparatus 11 via the communication link, the server apparatus 11 subtracts the value of the quantity-to-be-collected field in the user information 44 from the value of the quantity-to-be-delivered field in the supplier information 44 corresponding to the value of the supplier code field in the user information 44, and clears the values of the requested collection schedule field, the collection schedule field, and the quantity-to-be-collected field in the user information 44 (step S1715). Obviously, the collection schedule on the screen is also cleared. In order for the convenience of a process of creating a collection plan by the server apparatus 11, which will be described later, the arrangement may be such that the user 3 is prohibited from cancelling a scheduled collection on the collection schedule checking screen within a predetermined number of days (e.g., one week) prior to the scheduled collection date, or an e-mail for confirmation is sent from the server apparatus 11 to the user terminal 31 a predetermined number of days prior to the scheduled collection date, so that the user 3 will take care.

Furthermore, if the user 3 desires to reference the past collection record from the collection schedule checking screen shown in FIG. 21, the user 3 clicks on "Collection Record" button. Upon being notified via the communication link that "Collection Record" button has been clicked on, the server apparatus 11 supplies a collection record screen (not shown) to the user terminal 31. The collection record screen shows a list of collection records (date/quantity) in the user information 44 stored in the DB 15. The date and quantity corresponds to collection record stored in the DB 15. By allowing the user 3 to check collection record on the user terminal 31, the user 3 will presumably be encouraged to have used products recovered. Furthermore, by giving award point information based on the number of collected products and showing it on the collection record screen, the user 3 will be further encouraged to have used products recovered.

Furthermore, by associating a collection date and quantity with the collection record field in the DB 15 shown in FIG. 5, the collection date and the quantity of consumable products can be managed for each type of product in the DB 15. By providing such a system, the server apparatus 11 stores and manages collection record in the DB 15 for each user for each type of consumable product, and when "Collection Record" button in the collection schedule checking screen shown in FIG. 21 is clicked on, the server apparatus 11 supplies detailed collection record for each type of consumable product, associated with user information of an identified user. Management of types of consumable product will be described later in relation to a second embodiment. When "Close" button is clicked on in the collection schedule checking screen shown in FIG. 21, upon being notified that "Close" button has been clicked on, the server apparatus 11 supplies the menu screen (FIG. 19) again to the user terminal 31 (step S1703).

Editing of User Information

Figure 22:
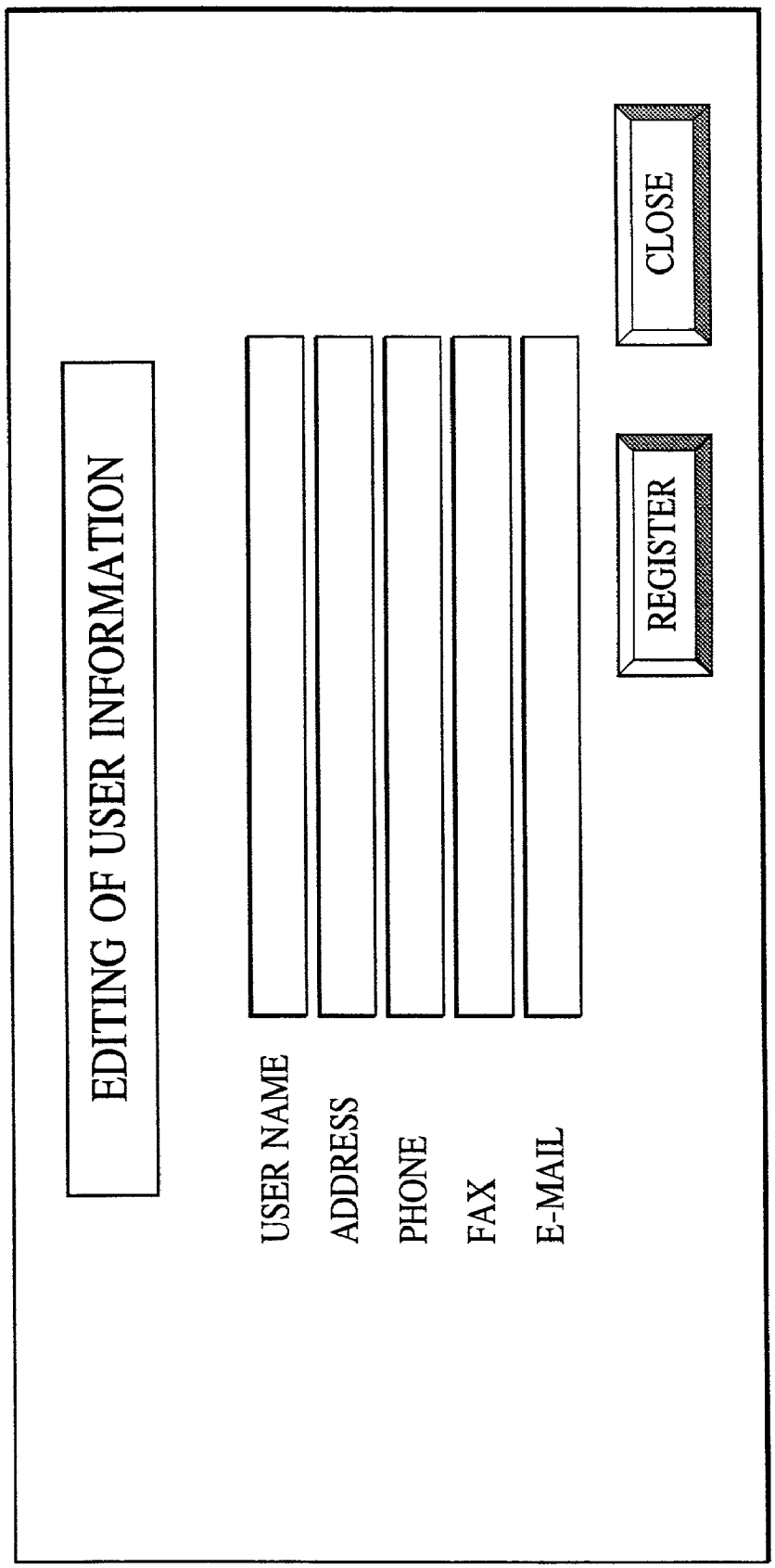
FIG. 22 is a diagram showing an example of user information editing screen.

When "Editing of User Information" button in the user menu screen (FIG. 19) is clicked on, the server apparatus 11 supplies a user information editing screen (FIG. 22) to the user terminal 31 (step S1716). The user information editing screen allows the user 3 to check and edit its own user information (user name, address, phone number, facsimile number, e-mail address).

When the user 3 clicks on "Register" button on the user information editing screen, the server apparatus 11 updates the values of the user name field and the address/contact field in the user information 44 stored in the DB 15 with values entered in the entry fields for user name, address, phone number, facsimile number, and e-mail address (step S1717). It is to be understood that if any required information item is missing, the server apparatus 11 supplies a dialog with an alert to the user terminal 31, prompting the user 3 to enter required information. If "Close" button is clicked on, the server apparatus 11 does not update the user information 44, it supplies the menu screen (FIG. 19) to the user terminal 31 (step S1703).

Logout

When "Logout" button in the menu screen (FIG. 19) is clicked on, the server apparatus 11 supplies the login screen (FIG. 18) to the user terminal 31 (S1701).

Now, creation of a collection plan, executed a predetermined number of days (e.g., one week) prior to a scheduled collection date, will be described.

When used consumable products are collected by vehicles, the entire collection area of the recovery center 1 are suitably divided and allocated to the vehicles so that each vehicle will be responsible for a limited area. FIG. 23 shows quantity of used consumable products requested for collection (quantity to be collected) in each area, which is calculated by the server apparatus 11. The contents shown in FIG. 23 can be readily obtained from the information entered to terminal apparatuses of users via screens such as the one shown in FIG. 20, transmitted via communication links to the server apparatus 11, and stored in the collection schedule field and the quantity-to-be-collected field in the user information list in the DB 15.

The recovery center 1 has its own vehicles for collecting consumable products. The number of vehicles to be owned is determined based on past records such as the number of products collected in a particular region in a particular period (e.g., past one year).

Figure 26:
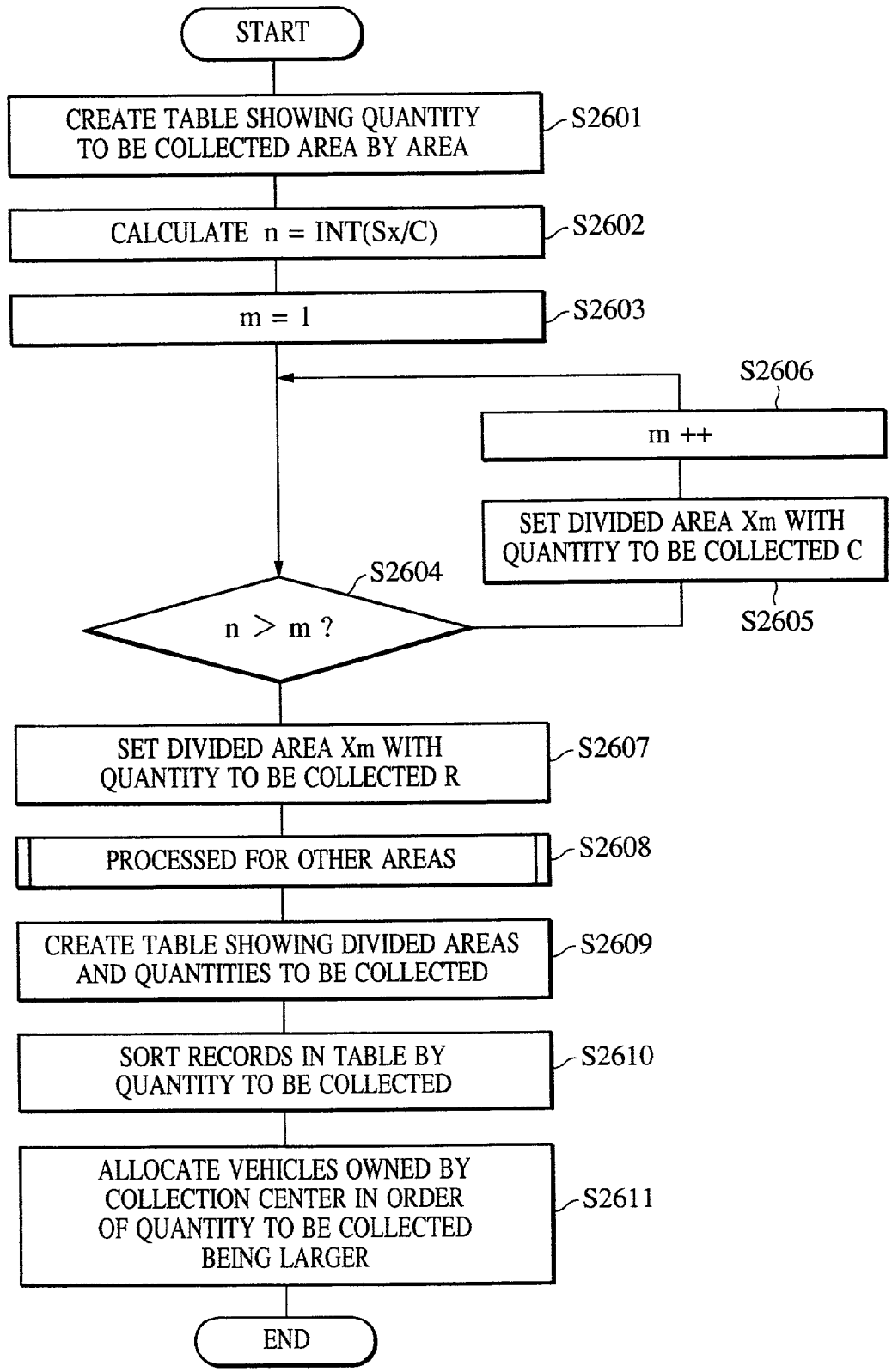
FIG. 26 is a flowchart showing a process for creating a collection plan.

The following describes a procedure for creating a collection plan by the server apparatus 11 with reference to a flowchart shown in FIG. 26, in which it is to be assumed that the recovery center 1 owns three vehicles, each vehicle capable of accommodating on the order of 200 used consumable products.

The server apparatus 11 searches the user information list 43 to find quantity to be collected in each area on a day for which a collection plan is to be created, thereby creating a table shown in FIG. 23 in a memory (step S2601). Then, quantity to be collected SX in an area X is divided by the capacity of each vehicle C (=200), obtaining an integer quotient n (step S2602). Then, "1" is set to a variable m (step S2603), and n>m is evaluated (step S2604). If n>m evaluates to true, a divided area Xm with quantity to be collected being 200 is set (step S2605), the variable m is incremented step (S2606) and the process returns to step S2604. If n>m evaluates to false in step S2604, a divided area Xm with quantity to be collected being the remaining number of products is set (step S2607), and the process proceeds to a next area (step S2608). The quantity to be collected in the last divided area R can be expressed by: $R=SX-\{200\times(m-1)\}$.

That is, in the case of an area A shown in FIG. 23, since quantity to be collected SA=240, a divided area A1 with quantity to be collected being 200 is set in step S2605, and a divided area A2 with quantity to be collected R=40 is set in step S2607.

By the above process, based on the table shown in FIG. 23, the server apparatus 11 creates in the memory a table showing divided areas and quantities to be collected as shown in FIG. 24 (step S2609).

Then, the server apparatus 11 sorts the records in the table shown in FIG. 24 by quantity to be collected, creating a table shown in FIG. 25 in the memory (step S2610). Then, the vehicles owned by the recovery center 1 are allocated in order of quantity to be collected being larger (S2611). That is, quantity to be collected in divided areas is larger in order of A1, C1, and B1, so that the vehicles owned by the recovery center 1 are allocated to these areas. As for areas to which the vehicles are not allocated, collection is requested to an agent (typically a forwarding agent) other than the recovery center 1. The request is transmitted, for example, from the server apparatus 11 to a terminal apparatus or a server apparatus provided at a site of the agent via a communication link 4.

By creating a collection plan as described above, the vehicles owned by the recovery center 1 can be efficiently used. Furthermore, collection of used consumable products exceeding the total capacity of the vehicles owned by the recovery center is assigned to an outside agent. Thus, the recovery center is prevented from having to own an excessive number of vehicles, serving to reduce cost of collection. For example, let is be assumed that cost of a vehicle owned by the recovery center 1 is 50,000 yen per day including labor cost and that cost of recovery requested to an agent is 800 yen per product. Then, collection cost in areas D1 and A2 is 100,000 yen if vehicles of the recovery center 1 are used; whereas the collection cost will be reduced to 80,000 yen if collection is requested to the agent.

As described above, according to this embodiment, a user 3 is allowed to request recovery of used consumable products altogether to the recovery center 1 irrespective of the identities of associated suppliers 2.

Furthermore, the recovery center 1 is allowed to readily identify associated suppliers 2 from supplier codes attached to collected products, and to classify the collected products to corresponding suppliers 2 according to the supplier codes. Thus, used consumable products that are discarded instead of being recycled due to uncertainty as to their records and materials.

Furthermore, since the recovery center 1 collects used consumable products supplied by a plurality of suppliers 2, users 3 can be geographically grouped. Thus, each vehicle of the recovery center 1 will be responsible for collection in a predetermined area without collecting products around a large area. Accordingly, collection cost is reduced, and emission of environmental pollutants such as $CO_2$, NOx, and Sox associated with vehicle transportations is also reduced.

Second Embodiment

In the first embodiment, the server apparatus 11 generates a supplier code for identifying a supplier based on information entered via the supplier information registration/editing screen shown in FIG. 9, and issues the supplier code to the supplier terminal 21. The supplier code is used to classify collected products associated with a plurality of suppliers at the recovery center 1.

In a system according to a second embodiment, in addition to classifying collected products on the basis of the suppliers as in the first embodiment, collection status is managed on the basis of types of collected products. The second embodiment is based on the operations of the information apparatuses including the supplier terminals 21, the user terminals 31, and the server apparatus 11 described in relation the first embodiment. That is, the system described with reference to FIGS. 1 to 26 basically applies to the second embodiment, and the following description is mainly directed to features that differ therefrom.

Figure 32:
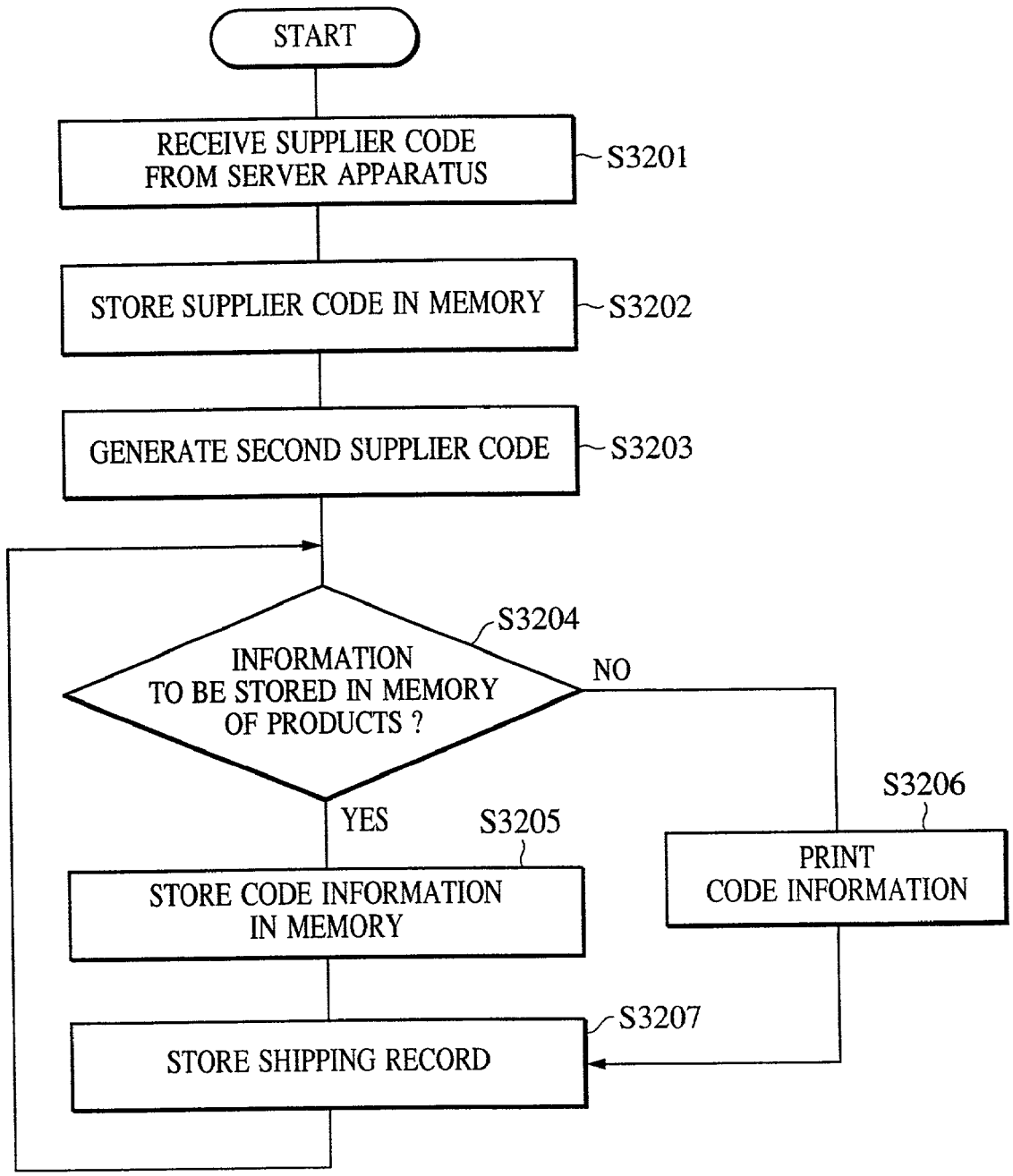
FIG. 32 is a flowchart showing a process to be executed by suitable information processing apparatus provided at a site of a supplier.

FIG. 32 corresponds to FIG. 15 for the first embodiment. Steps S3201 and S3202 in FIG. 32 refer to the same processes as in steps S1501 and S1502 in FIG. 15, and thus detailed descriptions thereof will be omitted. In step S3203, a terminal apparatus 21 or a predetermined information processing apparatus provided at a site of a supplier 2 generates a second supplier code in which a supplier code received from the server apparatus 11 via a predetermined communication link in step S3201 is associated with product identification information.

Then, processes in steps S3204 to S3207 are executed based on the second supplier code issued in step S3203. In step S3204, it is determined whether the second supplier code is to be stored in a memory of each product. In step S3205, the second supplier code generated in step S3203 is stored in a non-volatile memory of a product. In step S3207, shipping record information associated with the second supplier code written to the non-volatile memory in step S3205 is stored in the DB 15.

The product type information is predetermined by the supplier and stored in a predetermined storage unit so as to be usable by a terminal apparatus that plays a main role in the process shown in FIG. 32.

Figure 33A:
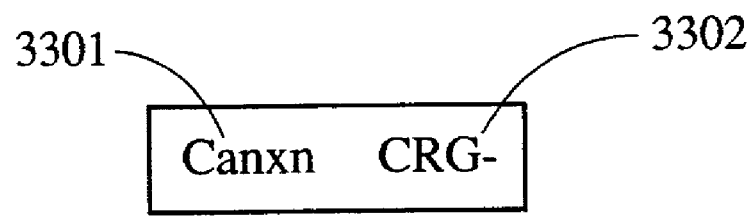
FIGS. 33A and 33B are diagrams showing example prints of label information including a supplier code and a product type.
Figure 33B:
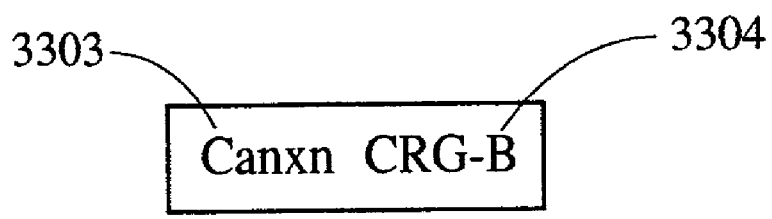

FIGS. 33A and 33B relate to step S3206, and correspond to FIG. 16 for the first embodiment. Referring to FIGS. 33A and 33B, in addition to supplier identification information (3301 and 3303) shown in FIG. 16, information for identifying types of cartridge (3302 and 3304) is included.

The identification information shown in FIGS. 33A and 33B, which is used in the process shown in FIG. 32, may be, for example, in the form of bar code instead of text data.

As described above, information identifying a product type is added to each product by the processes in steps S3205 and S3206. Thus, if products that have been supplied are unitarily collected at the recovery center 1 by a system similar to the one according to the first embodiment, the server apparatus 11 is allowed to manage collection/delivery status for each supplier and for each product type in the DB 15.

Next, product types will be described in detail. Product types in this embodiment correspond to information indicating product type numbers (information identifying specifications and manufacturing dates of products). Product types may also refer to information indicating types of recycle processes for products. Recycle processes include, for example, reuse of parts, reuse of materials after comminuting (e.g., amorphous silicon). By managing recovery records in association with product types, the recovery records can be managed in association with types of recycling processes.

Then, based on the procedure that has been described with reference to FIGS. 32 and 33A to 33B, in steps S413 and S414 shown in FIG. 4, recovery record is read and updated in the DB 15 for each supplier and for each product type. The supplier codes are read in the same manner as in the first embodiment, and description thereof will not be repeated.

Next, the structure of data stored in the DB 15 of the server apparatus 11 in the second embodiment will be described with reference to FIG. 34, which corresponds to FIG. 5 for the first embodiment.

Figure 34:
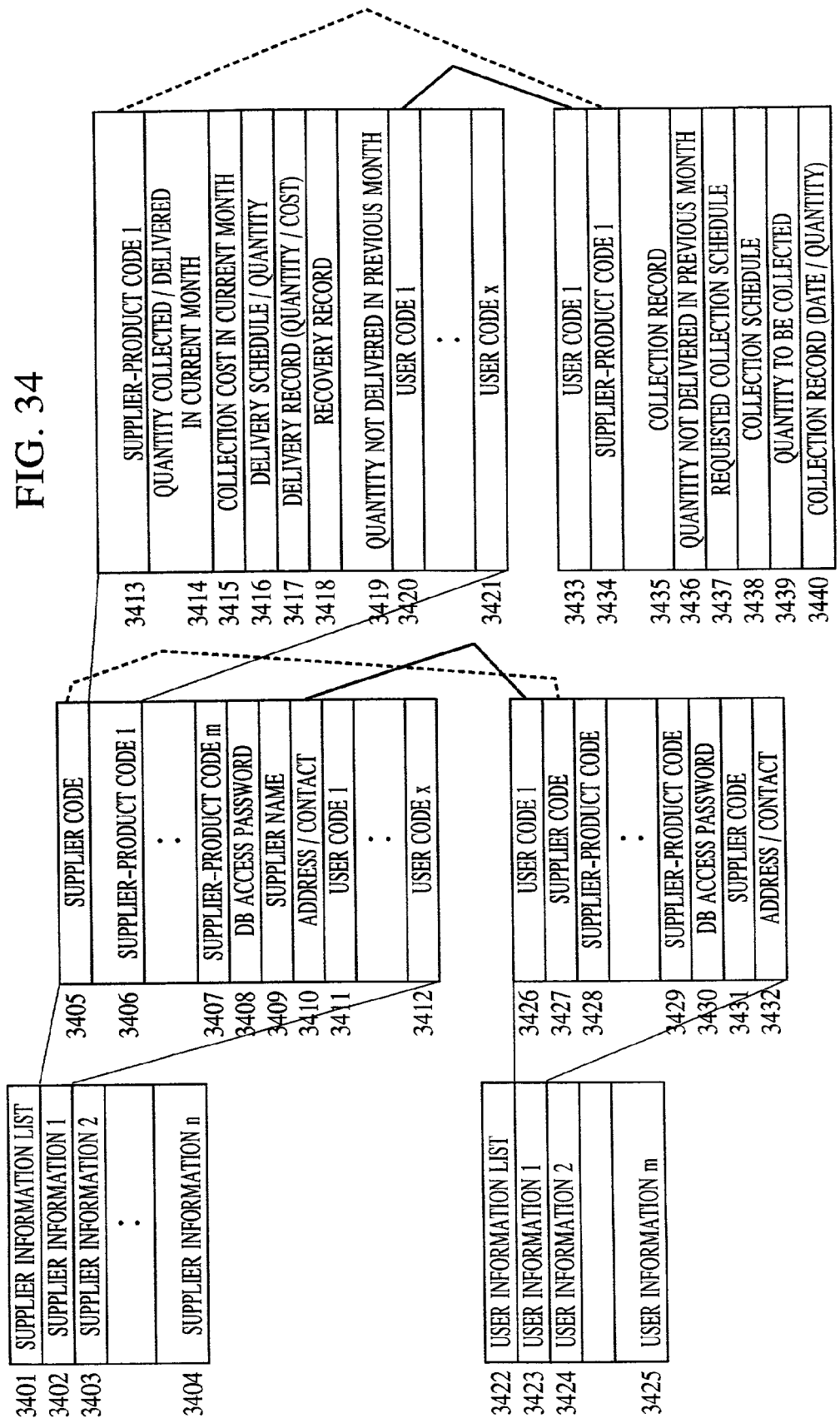
FIG. 34 is a diagram showing an example data structure in a database.

Referring to FIG. 34, supplier information list 3401 and supplier information 3402 to 3404 correspond to their counterparts 41 and 42 in FIG. 5.

A supplier code 3405 corresponds to its counterpart in FIG. 5. Product codes 3406 and 3407 are associated with the supplier code 3405. A DB access password 3408, a user name 3409, and an address/contact 3410 correspond to their respective counterparts in FIG. 5. The data fields 3408 to 3410 are referenced when a supplier code and/or a DB access password for identifying a supplier is input to the server apparatus 11 via a communication link (step S601).

User codes 3411 and 3412 correspond to their counterpart in FIG. 5, and indicate a list of users associated with the supplier code 3405. The data fields 3411 and 3412 are used when referencing user information based on the supplier code 3405.

Data fields 3427 to 3431 store supplier codes and product codes.

Data fields 3413 to 3421 store details associated with the supplier-product code 3406.

Data fields 3413 to 3440 stores detailed information associated with the supplier-product code 3406, i.e., various information regarding delivery and collection. The data fields 3413 to 3440 are referenced by the server apparatus 11 when screens shown in FIGS. 35 and 36 and to be described later are displayed. The data fields 3413 to 3440 also stores schedule information that are set via user interface screens shown in FIGS. 37 and 38.

Data fields 3433 to 3440 stores further detailed information associated with the supplier-product code 3413 and the user code 3420. In this example, the data fields 3433 to 3440 stores detailed information including recovery record and recovery schedule associated with a particular user (corresponding to user code 1 in FIG. 34) and a particular product (corresponding to supplier-product code 1 in FIG. 34).

The information stored in the DB 15 are referenced by the server apparatus 11 as required in response to a request for information from an external terminal apparatus (see FIG. 1), and used for various control operations by the server apparatus 11.

Figure 35:
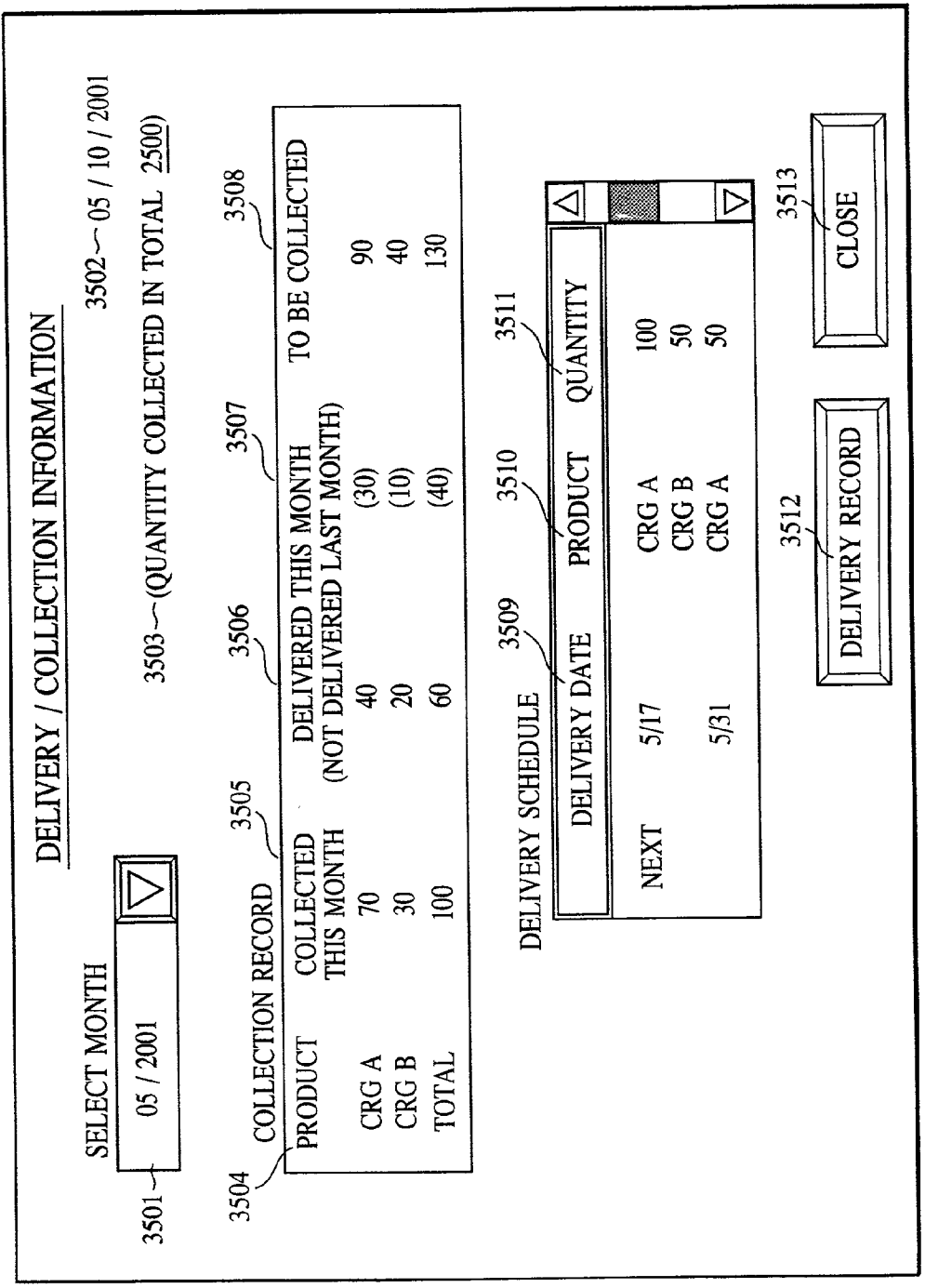
FIG. 35 is a diagram showing an example of delivery/collection information checking screen.

FIG. 35 corresponds to FIG. 13 for the first embodiment. That is, FIG. 35 shows a screen that is supplied to the supplier terminal 21 in response to processes by the server apparatus 11 in steps S415 and S617 shown in the flowcharts of FIGS. 4 and 6. The contents of various information shown in FIG. 35 are generated by the server apparatus 11 with reference to the various information described in relation to FIG. 34.

Referring to FIG. 35, a field 3501 shows a specified period, which is set to the current month or the next month by default. Fields 3504 to 3508 show quantity collected, quantity delivered, quantity not delivered, and quantity to be collected for each product in the specified period. The contents on the screen are extracted from the DB 15 by the server apparatus 11 in accordance with supplier identification information (corresponding to the supplier code 3405 and the DB access password 3408) input to the server apparatus 11 via the login screen shown in FIG. 8, and generated as information to be displayed on the supplier terminal 21.

More specifically, the supplier code 3405 of an associated supplier is determined based on the login information (a supplier code, a password, etc. entered via the screen in FIG. 8), collection/delivery information (3406 and 3407) associated with the identified supplier is extracted for each product, and relevant information (3413 to 3420) is extracted for each product, whereby information constituting the screen shown in FIG. 35 is generated. The information is transmitted to the supplier terminal 21 via a predetermined communication link.

When a signal indicating a click on a delivery record button 3512 is transmitted from the supplier terminal 21 to the server apparatus 11 via the communication link, the server apparatus 11 references delivery schedule information and delivery record information corresponding to the data fields 3417 and 3418 in FIG. 34, and supplies a screen shown in FIG. 36 to the supplier terminal 21.

Referring to FIG. 36, a period is specified in a field 3601, and fields 3605 to 3607 shows delivery record for each product in the specified period. Although only delivery record is shown in FIG. 36, collection record for each product may also be included. The record information shown in FIG. 36 is generated by the server apparatus 11 and supplied to the supplier terminal 21, similarly to the information shown in FIG. 35.

Figure 37:
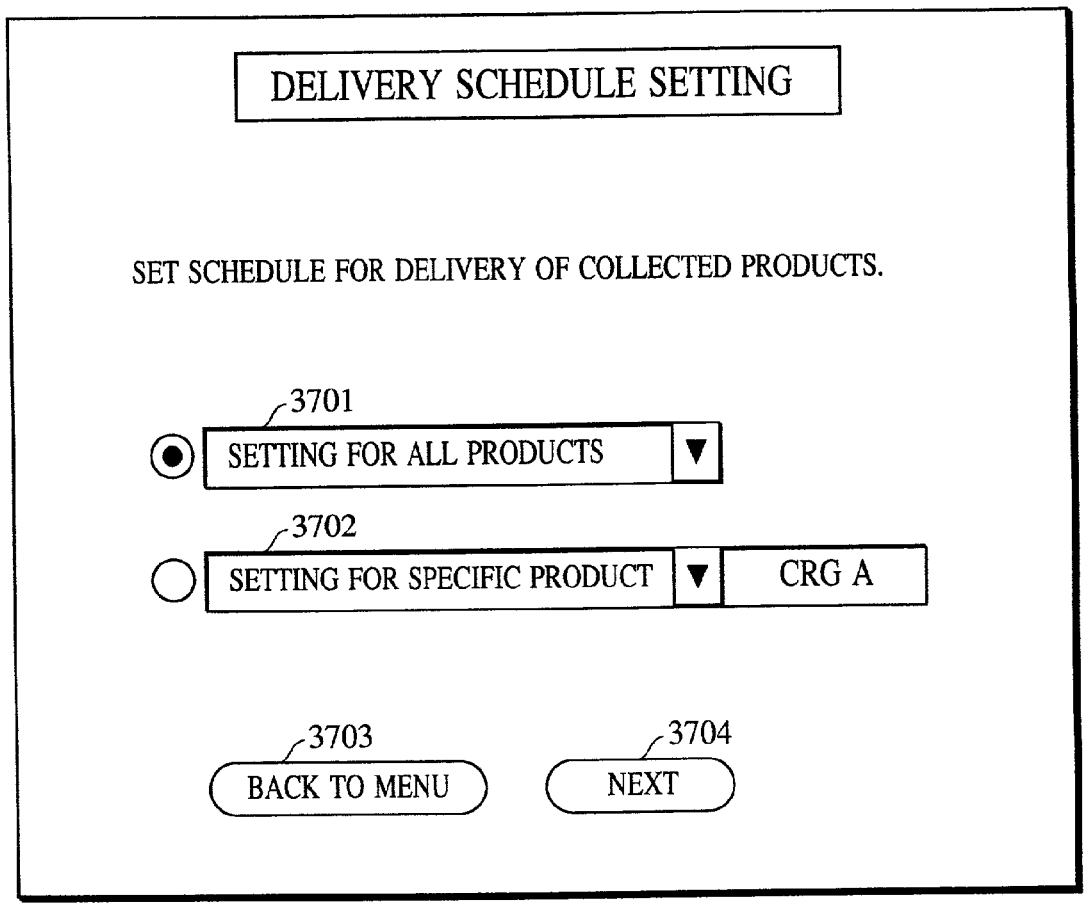
FIG. 37 is a diagram showing an example of delivery/collection information checking screen supplied to a terminal apparatus of a supplier in a second embodiment of the present invention.

FIG. 37 shows a user interface screen for setting timing for reporting such information as shown in FIGS. 35 and 36 to the supplier terminal 21, and the screen is supplied from the server apparatus 11 to the supplier terminal 21.

When a signal indicating setting for all products (3701) is transmitted to the server apparatus 11, the server apparatus 11 supplies a user interface screen (setting-for-all-products UI) for setting a condition regarding timing of reports simultaneously for all types of products to the supplier terminal 21 at the source of the signal. This is achieved similarly to FIG. 11, and description thereof will be omitted.

Figure 38:
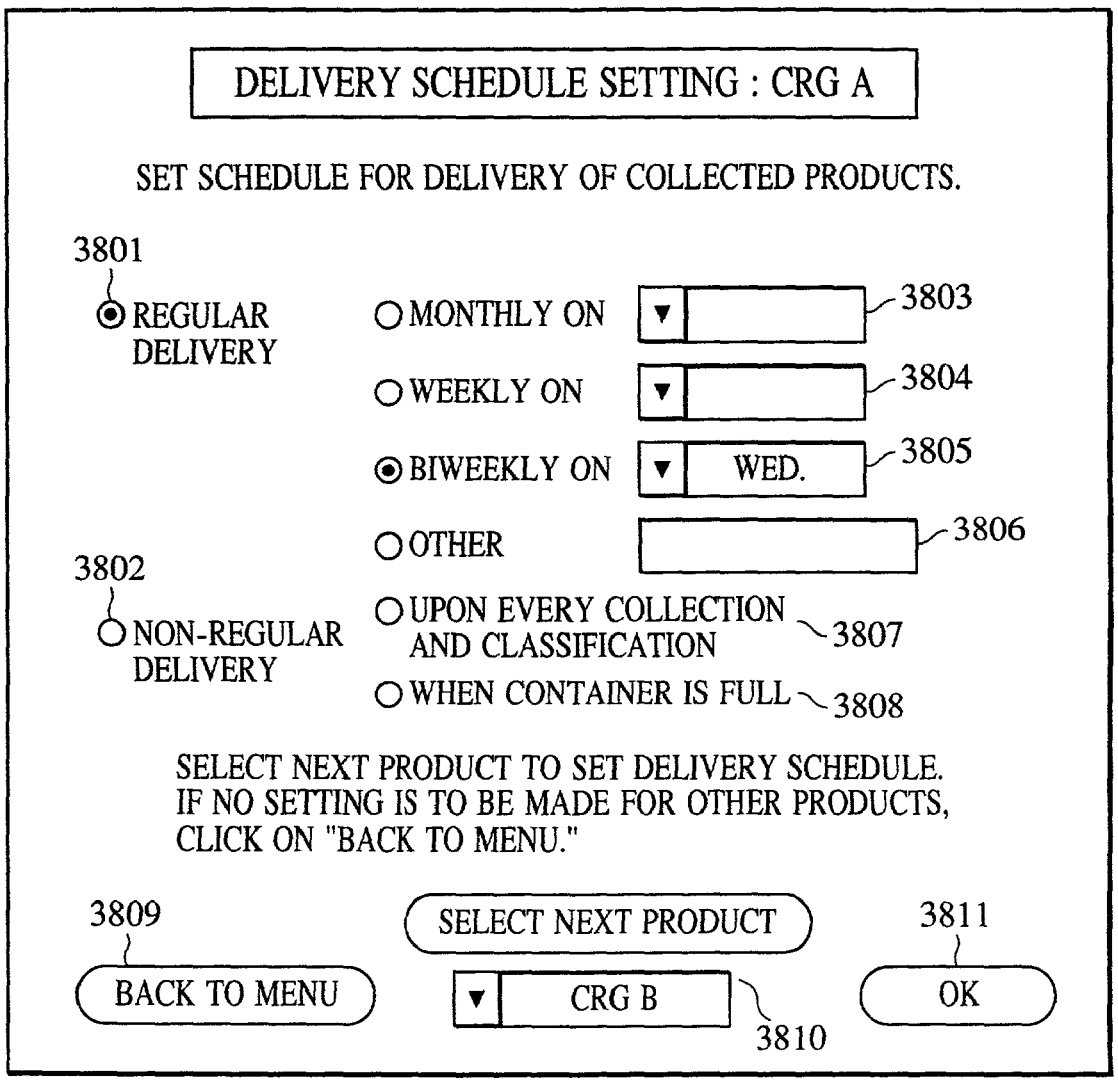
FIG. 38 is a diagram showing an example of user interface screen for setting a timing for reporting delivery/collection information for each product type.

When a signal indicating setting for a specific product (3702) is transmitted to the server apparatus 11, the server apparatus 11 supplies a user interface screen, shown in FIG. 38, for setting a condition regarding timing of reports for a specific product to the supplier terminal 21 at the source of the signal. FIG. 38 shows a user interface screen for setting a delivery schedule for collected products "CRG A." Furthermore, similarly to the first embodiment, FIGS. 37 and 38 may be used as a user interface screen for setting timing of reports of collection status to the user terminal 31.

The condition regarding timing for reporting collection/delivery information for each products, set via the setting screens shown in FIGS. 37 and 38, is stored in the DB 15 of the server apparatus 11 and referenced by the server apparatus 11 as required to find timing for reporting collection/delivery information.

To describe the screen shown in FIG. 37 in further detail, the field 3702 allows setting of product types. The product types to be set includes, for example, product type numbers (information identifying specifications and manufacturing dates of products), and types of recycling processes (parts reusable, materials reusable, etc.). For example, if "parts reusable" is specified as product type in the field 3702, the setting screen shown in FIG. 38 allows setting for products under the category of "parts reusable." Collection/delivery information of the product type specified in the field 3702 is reported to the supplier terminal 21 by the server apparatus 11 as required.

As described above, timing of reporting collection/delivery information can be specified via the user interface screen shown in FIG. 38 and managed by the server apparatus 11 for each product type. In addition, if type of recycle process is included in product type, the server apparatus 11 is allowed to extract collection/delivery information according to type of recycle process and to report the extracted collection/delivery information to the user terminal 31.

As described above, in the second embodiment, recovery status for each product can be managed in the DB 15 in addition to the processes in the first embodiment. Thus, detailed management information for each user and each supplier can be efficiently provided to a plurality of terminal apparatuses (the supplier terminals 21 and the user terminals 31).

Example of Consumable Products

Figure 27:
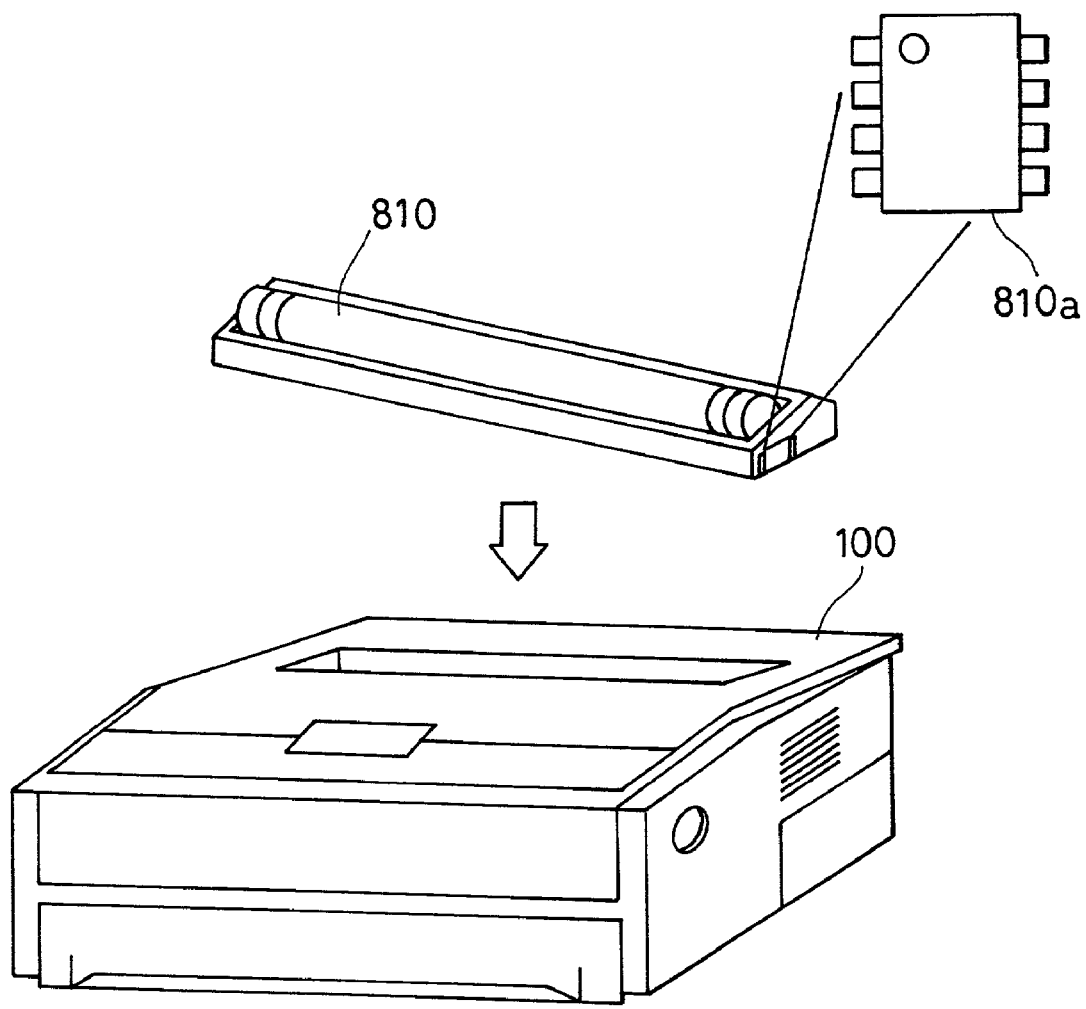
FIG. 27 is a diagram showing an example of a cartridge used in a printer.

FIG. 27 is a diagram showing a cartridge 810 used in a printer. The cartridge 810 incorporates a semiconductor memory 810a. When the cartridge 810 is mounted on a printer 100, the semiconductor memory 810a is electrically connected to a controller of the printer 100 so that reading from and writing to the semiconductor memory 810a are allowed.

Furthermore, although not shown in FIG. 27, a display panel may be provided, so that a type ID indicating the type of the cartridge 810, a serial number, the total number of prints, and the amount of remaining toner can be displayed. The type ID and the serial number are determined at the time of manufacture and will not be changed thereafter, and thus may be recorded, for example, by a print on a case of the cartridge 810. The total number of prints and the amount of remaining toner changes as the cartridge 810 is used, and thus a display panel is required for display thereof.

The display panel may be implemented by, for example, a liquid crystal display panel including a control circuit and a back-up power supply. Furthermore, the arrangement may be such that the semiconductor memory 810a is implemented by an EEPROM or a flash memory and the display panel is implemented by a type using ferroelectric liquid crystal, so that power must be externally supplied only when rewriting data on the semiconductor memory 810a, eliminating the need for a back-up power supply.

As described above, by storing identification information of the cartridge 810, such as the type ID and the serial number, in the cartridge 810 itself, the cartridge 810 can be readily and accurately identified from its external view or by reading data from the semiconductor memory 810a. Furthermore, by storing information regarding the usage status of the cartridge 810, such as the number of prints and the amount of remaining toner, in the cartridge 810 itself and displaying the information thereon, whether the cartridge 810 is new can be readily and accurately determined from its external view or by reading data from the semiconductor memory 810a.

FIG. 28 is a diagram showing an example of data stored in the semiconductor memory 810a.

The memory 810a stores data 901 indicating the total number printed using the cartridge 810 and the total jam number, data 902 and 903 indicating the number of prints and the jam number for each size of paper, etc. In FIG. 28, the number of prints or of sheets is referred to as count. The data are each count up each time a page is printed by the printer 100 in which the cartridge 810 is mounted.

The semiconductor memory 810a also stores data 904 indicating the amount of remaining toner. The data 904 may indicate the amount of remaining toner itself, or may be a flag representing an output from a sensor that detects whether the amount of toner has decreased to a predetermined amount, i.e., so-called toner low output.

The semiconductor memory 810a also stores data 905 indicating the start date and end date of usage of the cartridge 810, and data 906 indicating a usage period. The printer 100 usually has a sensor that detects opening and closing of a cover of a cartridge mounting unit. For example, when an opening and closing of the cover is detected, a controller of the printer 100 compares the serial number of the cartridge 810 stored in the non-volatile memory with a serial number read from the cartridge in place after the detection of the opening and closing of the cover. If the serial numbers do not match, it is determined that the cartridge 810 has been replaced. Then, data indicating the current date is written to the semiconductor memory 810a as the start date of usage. Furthermore, for example, upon every power-up or at a twenty-four hour interval, data indicating the current date is written to the semiconductor memory 810a as the end date of usage, and data indicating the corresponding usage period is also written to the semiconductor memory 810a.

Furthermore, the semiconductor memory 801a stores data 907 indicating identification information, including the type ID and the serial number, that has been written at the time of manufacture or shipping of the cartridge 810. The data 907 may also include data indicating a service center that is to be notified, for example, when toner has been used up.

Example of Device that uses Consumable Products

Figure 29:
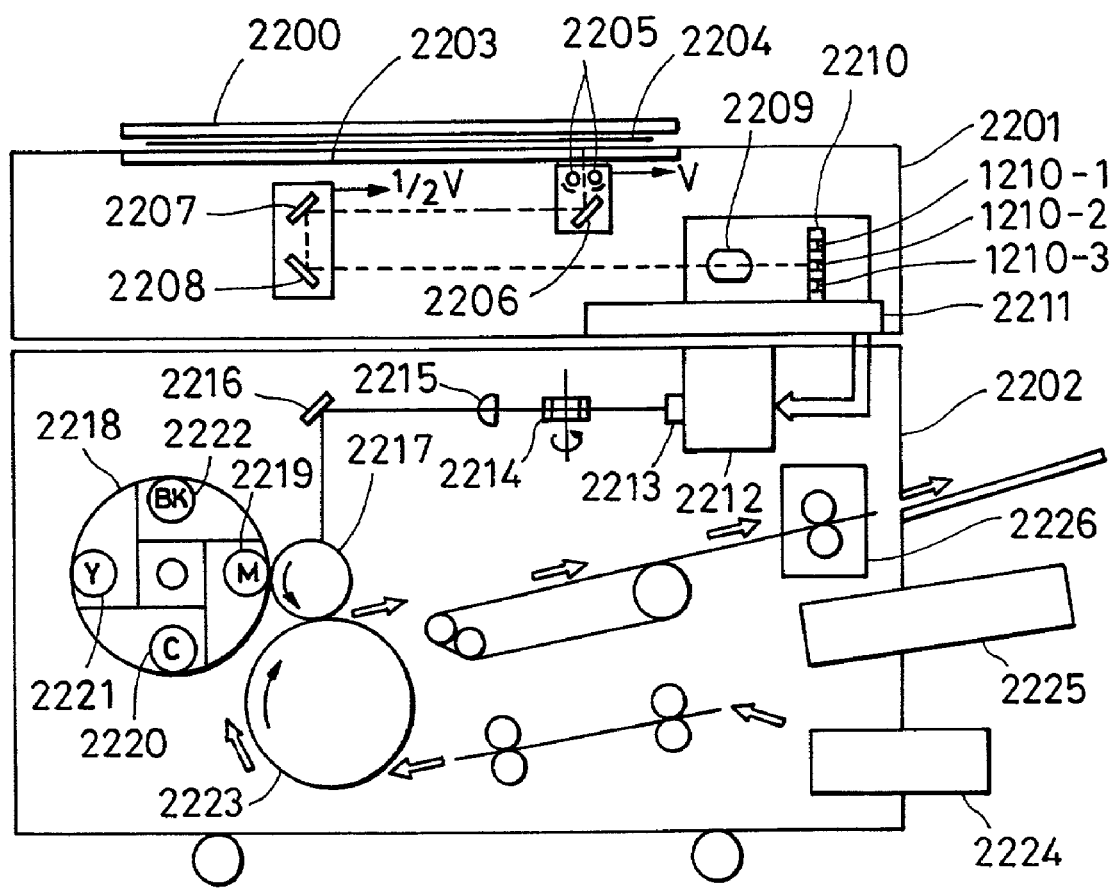
FIG. 29 is a schematic diagram showing an example construction of a laser beam printer.

FIG. 29 is a schematic diagram showing an example construction of a laser beam printer (LBP).

Referring to FIG. 29, an image scanner 2201 reads an image of an original document and digitally processes the image of the original document. A printer 2202 forms an image corresponding to the image of the original document read by the image scanner 2201 on a recording sheet.

In the image scanner 2201, an original document 2204 is placed on a platen glass 2203 with a recording surface facing down, and fixed by an original document holding plate 2200. A fluorescent lamp 2205 emits light, and the light is reflected by the original document 2204, guided by mirrors 2206, 2207, and 2208, and forms an image on a linear CCD image sensor (hereinafter referred to as CCD) 2210 through a lens 2209. In the lens 2209, an infrared cutting filter is provided. The CCD 2210 decomposes the light reflected by the original document 2204 into components of red (R), green (G), and blue (B), and transmits corresponding analog image signals to an image processing unit 2211. The original document 2204 is thoroughly read by the unit including the fluorescent lamp 2205 and the mirror 2206 being mechanically moved at a velocity V, and the unit including the mirrors 2207 and 2208 at a velocity of V/2, in the sub-scan direction perpendicular to the CCD 2210.

The CCD 2210 is implemented, for example, by photosensitive pixels arrayed in three lines (1210-1 to 1210-3), the number thereof being on the order of 7,500 for each of R, G, and B, so that the shorter side (297 mm) of an A3 original document can be read at a resolution of 600 dpi. In order to read the shorter side (297 mm) of an A3 original document at a resolution of 400 dpi, a one-dimensional image sensor with the number of pixels on the order of 5,000 for each of R, G, and B suffices.

The image processing unit 2211 converts the analog image signals output from the CCD 2210 into digital image signals, and transmits to the printer 2202 components of yellow (Y), magenta (M), cyan (C), and black (BK) corresponding to the colors of toners for printing. Furthermore, upon each scan (each sub-scan) of an original document by the image scanner 2201, one of the components of Y, M, C, and BK is transmitted to the printer 2202. Thus, it takes four scans of an original document to sequentially transmit components of the four colors to the printer 2202 so that a print can be completed. If the image processing unit 2211 has a sufficiently large memory, image signals corresponding to the four colors may be acquired by a single scan on an original document and stored in the memory, eliminating the subsequent three scans.

The image signals corresponding to the components of Y, M, C, and BK, sequentially transmitted from the image processing unit 2211, are input to a laser driver 2212 in the printer 2202. The laser driver 2212 lets a laser diode 2213 emit laser beam in accordance with the image signals input thereto. The laser beam emitted by the laser diode 2213 scans over a photosensitive drum 2217 via a polygon mirror 2214, f-θ lens 2215, and a mirror 2216, whereby an electrostatic latent image is formed on the photosensitive drum 2217.

The electrostatic latent image formed on the photosensitive drum 2217 by the laser beam is developed by developing devices 2219 to 2222 having toners of yellow, magenta, cyan, and black, respectively. That is, the four developing devices 2219 to 2222 are sequentially abutted to the photosensitive drum 2217 so that the latent image will be developed with the toners of the four colors.

A recording sheet supplied from a recording sheet cassette 2224 or a recording sheet cassette 2225 is wound on a transfer drum 2223 so that the toner image on the photosensitive drum 2217 will be transferred thereto. If toners of the four colors are used for recording, the transfer drum 2223 is rotated four times so that the toners of the four colors are transferred and superposed on the recording sheet. Then, the recording sheet is detached from the transfer drum 2223, transferred to a fixing unit 226 to fix the toner image, and then ejected to outside of the apparatus.

In the LBP described above, the photosensitive drum 2217, toners or cartridges contained in the developing devices 2219 to 2222, and recording sheets contained in the recording sheet cassettes 2224 and 2225 are consumable products.

Although not shown, the laser beam printer shown in FIG. 29 may include an interface with an external apparatus such as a personal computer, so that an image based on image data transmitted from the external apparatus may be printed on a recording medium.

Figure 30:
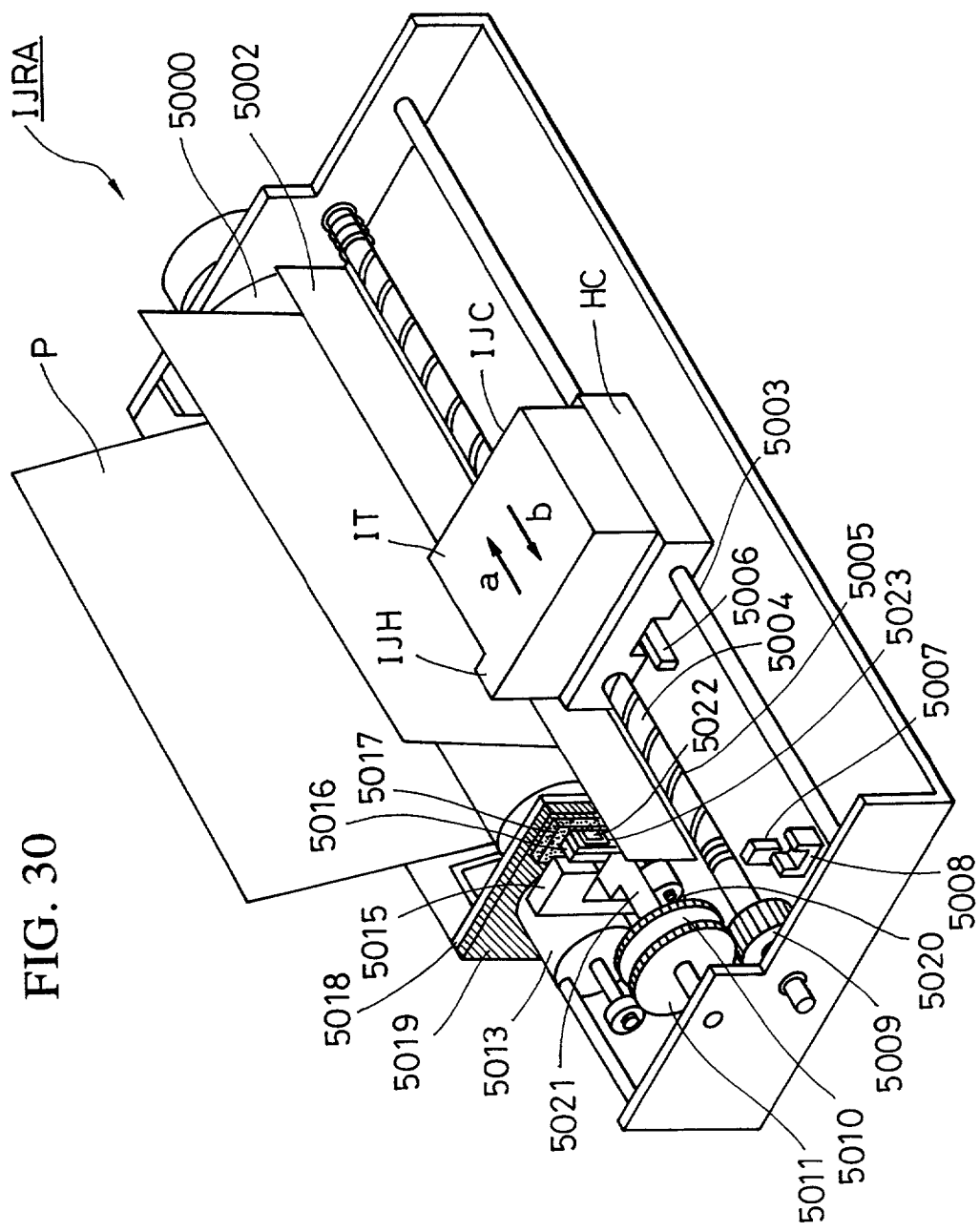
FIG. 30 is a schematic diagram showing an example construction of an ink jet printer.

FIG. 30 is a schematic diagram showing an example construction of an ink jet printer (IJRA) on which consumable products are mounted.

Referring to FIG. 30, a drive motor 5013 rotates in normal and reverse directions. In association with the rotation of the drive motor 5013, a lead screw 5004 rotates via driving force transmission gears 5011 and 5009. The lead screw 5004 has a spiral groove 5005, with which a carriage HC is engaged. The carriage HC has a pin (not shown), and reciprocated in the directions indicated by arrows a and b. In the carriage HC, an ink jet cartridge IJC is mounted.

A sheet holding plate 5002 presses a recording sheet P against a platen 5000 over the length of the carriage HC in the direction of movement thereof. Photosensors 5007 and 5008 form a home position detecting unit for determining whether a lever 5006 of the carriage HC is located at a region where the photosensors 5007 and 5008 are provided, so that the direction of rotation of the driving motor 5013 can be switched accordingly. A supporting member 5016 supports a cap member 5022 that covers a front face of a recording head IJH. A suction member 5015 sucks inside the cap member 5022, and it performs suction and restoration of the recording head IJH via a cap opening 5023.

A moving member 5019 allows a cleaning blade 5017 to be moved forward and backward, and the moving member 5019 and the cleaning blade 5017 are supported by a main unit supporting plate 5018. It is to be understood that any know type of cleaning blade may be used without limitation to the above example. A lever 5021 is used to start suction and restoration, and it is moved in association with movement of a cam engaged with the carriage HC by a driving force from the drive motor 5013, controlled by a known type of transmission unit such as a clutch switching unit.

The capping, cleaning, and suction and restoration are executed at corresponding positions by the operation of the lead screw 5004 when the carriage HC is in an area on the side of the home position, and the operations are performed at timings known in the art.

In the IJRA, the ink jet cartridge and ink contained therein are consumable products.

Other Embodiments

The present invention may be applied to a system constituted of a plurality of apparatuses (e.g., host computers, interface apparatuses, readers, printers, etc.) or to a single apparatus (e.g., copying machine, facsimile machine, multifunction machine with copying function and facsimile function, etc.). The arrangement may also be such that the processes on each of the terminal apparatuses described earlier are executed by an image forming apparatus that functions as a terminal apparatus, such as a copying machine, a printer, etc. An image forming apparatus 32 shown in FIG. 2 is an example thereof.

Furthermore, it will be readily understood that the objects of the present invention can also achieved by supplying a storage medium (or recording medium) storing program code of software for implementing the functions of the above-described embodiments to a system or an apparatus, so that a computer (CPU or MPU) in the system or the apparatus reads and executes the program code stored in the storage medium. In that case, the program code read from the storage medium achieves the functions of the above-described embodiments. Furthermore, similarly to achieving the functions of the above-described embodiments by a computer executing the program code, the functions of the above-described embodiments may be achieved by an operating system (OS), etc. running on the computer executing part of or all of the processes, which is also within the scope of the present invention.

Furthermore, the program code read from the storage medium may be written to a non-volatile memory of an extension board inserted in the computer or an extension unit connected to the computer, so that the functions of the above-described embodiments will be achieved by a CPU, etc. in the extension board or the extension unit executing part of or all of the processes, which is also within the scope of the present invention.

When the present invention is applied to a storage medium, program code in accordance with the sequence diagram and flowcharts described earlier will be stored in the storage medium.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method of managing collection information by a management server for unitarily managing collection information for office products associated with a plurality suppliers, said method comprising:

a management step of managing collection information of a plurality of office products for each of the plurality of suppliers;

an input step for inputting identification information identifying one of the plurality of suppliers, transmitted from an external information processing apparatus via a predetermined communication link;

an extracting step for extracting collection information associated with the identification information input in said input step;

a reporting step for reporting the collection information extracted in said extracting step to said information processing apparatus via the predetermined communication link;

a determination step for determining whether the collection information has reached a predetermined condition, wherein the collection information is reported to a pre-registered destination in said reporting step if it is determined in said determination step that the collection information has reached the predetermined condition;

a setting screen providing step for transmitting setting screen information for setting the predetermined condition to said information processing apparatus via the predetermined communication link;

a storing step for receiving information regarding the predetermined condition via the predetermined communication link, the information regarding the predetermined condition being specified via a screen displayed on a display unit of said information processing apparatus based on the setting screen information, and for storing the information regarding the predetermined condition in a database, wherein the information regarding the predetermined condition is stored for each of the plurality of suppliers in said storing step, and collection information is reported on the basis of the information regarding the predetermined condition for each of the plurality of suppliers in said reporting step, wherein the information regarding the predetermined condition is set for each type of office products on the setting screen displayed based on the setting screen information, and the information regarding the predetermined condition for each type of office products is stored in the database via the predetermined communication link in said storing step, and wherein the type of office products include information regarding a type of recycling process, collection information is extracted for each type of recycling process in said extracting step, and the extracted collection information is reported to said information processing apparatus via the predetermined communication link in said reporting step.

* * * * *

UNITED STATES PATENT AND TRADEMARK OFFICE
CERTIFICATE OF CORRECTION

PATENT NO. : 7,136,831 B2
APPLICATION NO. : 10/126526
DATED : November 14, 2006
INVENTOR(S) : Mori et al.

It is certified that error appears in the above-identified patent and that said Letters Patent is hereby corrected as shown below:

SHEET 5:
FIG. 5, "PRIVIOUS" should read -- PREVIOUS --.

SHEET 17:
FIG. 17, "GASED" should read -- BASED --.

COLUMN 4:
Line 1, delete "are diagrams" (second occurrence).

COLUMN 9:
Line 29, "to" should read -- by --.

COLUMN 14:
Line 31, "if" should read -- of --.

COLUMN 16:
Line 28, "each" should read -- each of --; and
Line 62, "filed" should read -- field --.

COLUMN 20:
Line 51, "schedule" should read -- scheduled --.

COLUMN 22:
Line 10, "are" should read -- is --;
Line 41, "step" should read -- (step --; and
Line 42, "(S2606)" should read -- S2606) --.

COLUMN 23:
Line 38, "Sox" should read -- SOx --.

COLUMN 28:
Line 1, "memory 801a" should read -- memory 810a --.

UNITED STATES PATENT AND TRADEMARK OFFICE
CERTIFICATE OF CORRECTION

PATENT NO. : 7,136,831 B2
APPLICATION NO. : 10/126526
DATED : November 14, 2006
INVENTOR(S) : Mori et al.

It is certified that error appears in the above-identified patent and that said Letters Patent is hereby corrected as shown below:

COLUMN 30:
Line 55, "plurality" should read -- plurality of --.

Signed and Sealed this

Eighteenth Day of March, 2008

JON W. DUDAS
*Director of the United States Patent and Trademark Office*